(12) United States Patent
Zhu et al.

(10) Patent No.: US 10,807,912 B1
(45) Date of Patent: Oct. 20, 2020

(54) ADVANCED HIGH TEMPERATURE ENVIRONMENTAL BARRIER COATING SYSTEMS FOR SIC/SIC CERAMIC MATRIX COMPOSITES

(71) Applicant: U.S.A., as represented by the Administrator of the National Aeronautics and Space Administration, Washington, DC (US)

(72) Inventors: Dongming Zhu, Westlake, OH (US); Janet B. Hurst, Columbia Station, OH (US)

(73) Assignee: United States of America as Represented by the Administrator of National Aeronautics and Space Administration, Washington, DC (US)

( * ) Notice: Subject to any disclaimer, the term of this patent is extended or adjusted under 35 U.S.C. 154(b) by 388 days.

(21) Appl. No.: 15/582,874

(22) Filed: May 1, 2017

Related U.S. Application Data

(63) Continuation-in-part of application No. 13/923,450, filed on Jun. 21, 2013.

(60) Provisional application No. 62/329,500, filed on Apr. 29, 2016, provisional application No. 61/663,201, filed on Jun. 22, 2012.

(51) Int. Cl.
| | | |
|---|---|---|
| *B32B 3/10* | (2006.01) | |
| *C04B 35/16* | (2006.01) | |
| *C04B 35/505* | (2006.01) | |
| *C04B 35/48* | (2006.01) | |
| *C04B 41/89* | (2006.01) | |
| *C04B 41/52* | (2006.01) | |

(52) U.S. Cl.
CPC ............ *C04B 35/16* (2013.01); *C04B 35/481* (2013.01); *C04B 35/505* (2013.01); *C04B 41/52* (2013.01); *C04B 41/89* (2013.01); *C04B 2235/3224* (2013.01); *C04B 2235/3427* (2013.01)

(58) Field of Classification Search
None
See application file for complete search history.

(56) References Cited

U.S. PATENT DOCUMENTS

2013/0344319 A1* 12/2013 Zhu ..................... C04B 41/5044
428/335
2015/0267058 A1* 9/2015 Lee .......................... C09D 1/00
428/335

* cited by examiner

*Primary Examiner* — Christopher M Polley
(74) *Attorney, Agent, or Firm* — Robert H. Earp, III; Mark Wolfgang; Helen M. Galus

(57) ABSTRACT

Advanced environmental barrier coating bond coat systems with higher temperature capabilities and environmental resistance are disclosed. These bond coat systems can be applied to ceramic substrates such as SiC/SiC ceramic matrix composite substrates, and can provide protection from extreme temperature, mechanical loading and environmental conditions, such as in high temperature gas turbines. Example bond coat systems can include either an advanced silicon/silicide component, an oxide/silicate component, or a combination thereof.

20 Claims, 31 Drawing Sheets

| Coating | Thick. (μm) | Composition (at.%) | | | | | |
|---|---|---|---|---|---|---|---|
| | | Si | Y | Gd | Yb | Hf | N |
| YbGdYSi | 0.12 | 62.19 | 11.05 | 10.01 | 16.74 | | |
| YbGdYSi | 26.4 | 22.12 | 6.57 | 26.17 | 45.14 | | |
| YbGdYSi | 22.7 | 63.25 | 10.33 | 10.96 | 15.47 | | |
| YbGdYSi | 27.8 | 61.54 | 8.69 | 9.8 | 19.97 | | |
| YbGdSi | 28.4 | 73.69 | 0.03 | 8.33 | 17.98 | | |
| YbGdSi | 27.6 | 71.61 | 0.06 | 10.21 | 18.15 | | |
| YbGdSi | 25.2 | 73.63 | 0.09 | 7.13 | 19.18 | | |
| YbGdSi | 24.7 | 75.82 | 0.04 | 9.78 | 14.31 | | |
| YbGdSi | 20.7 | 75.04 | 0.05 | 10.94 | 13.98 | | |
| YbSi | 17.7 | 80.66 | | 0.1 | 19.2 | | |
| YbYSi | 24.1 | 78.39 | | | 16.26 | 5.35 | 8.35 |
| YbHfSi | 19.6 | 62.64 | | 0.05 | 27.39 | 1.57 | 14.12 |
| YbHfSi | 20 | 66.19 | | 0.09 | 17.88 | 1.72 | |
| YbHfSi | 24.4 | 71.05 | | 0.11 | 27.48 | 1.36 | 16.5 |
| YbHfSi | 20.3 | 59.22 | | 0.11 | 23.22 | 0.95 | |
| YbSi | | 72.62 | | 0.14 | 22.72 | 4.52 | |
| | | 59.04 | | 0.11 | 17.98 | | 16.37 |

FIG. 11A

| Coating | Thick. (μm) | Composition (at.%) | | | | | | |
|---|---|---|---|---|---|---|---|---|
| | | Si | Zr | Y | Ta | Hf | Yb | Gd |
| YSi | 25.4 | | | | | | | |
| ZrSi+Y | 40 | | | | | | | |
| ZrSi+Y | | 42.03 | 48.82 | 9.15 | | | | |
| ZrSi+Ta | 36.6 | | | | | | | |
| ZrSi+Ta | | 34.08 | 53.07 | | 12.84 | | | |
| HfSi + Si | 11 | | | | | | | |
| HfSi + YSi | 21 | 50.16 | | 26.69 | | 23.15 | | |
| HfSi+YSi+Si | 28.2 | 61.99 | | 20.43 | | 17.58 | | |
| YbSi | 9.6 | 43.82 | | | | | 56.18 | |
| HfSi + YbSi | 15 | 44.86 | | | | 20.08 | 35.06 | |

FIG. 11B

| Coating composition (at.%) | | | | | Coating Thickness (µm) |
|---|---|---|---|---|---|
| Ti | Al | Cr | Ta | Si | |
| 25 | 23 | 27.7 | 23.5 | 0 | 19.3 |
| 40.7 | 7.9 | 38.2 | 12.9 | 0 | 11.9 |
| 28.4 | 28.6 | 31.9 | 10.7 | 0 | 14 |
| 31.2 | 35.8 | 32.9 | 0.1 | 0 | |
| 28.1 | 27.9 | 23.6 | 20.4 | 0 | |
| 12.5 | 30.6 | 27.2 | 29.7 | 0 | |
| 29.1 | 32 | 30.4 | 8.5 | 0 | |
| 29.1 | 32 | 30.4 | 8.5 | 0 | |
| 22.7 | 44.4 | 21.5 | 11.5 | 0 | |
| 25.8 | 35.9 | 24.7 | 13.6 | 0 | |
| 25.2 | 18.7 | 26.5 | 14.9 | 14.7 | 17.3 |
| 27.2 | 8.2 | 40 | 14.1 | 10.4 | 15 |
| 19.1 | 29.3 | 38.9 | 12.7 | 0 | 17.4 |
| 30.3 | 7.86 | 56 | 0.3 | 5.57 | 18.3 |
| 38 | 14.4 | 41 | 0 | 6.7 | 14.7 |
| 35.8 | 9.5 | 23.5 | 3.3 | 28 | 19.9 |
| 22.4 | 18.1 | 18.1 | 6.3 | 35.1 | 19.7 |
| 22.8 | 23.7 | 19.7 | 6.1 | 28.4 | |

FIG. 11C

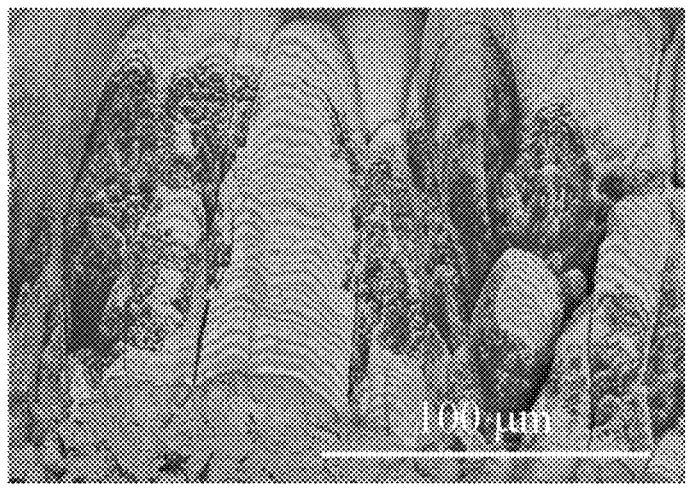
FIG. 13
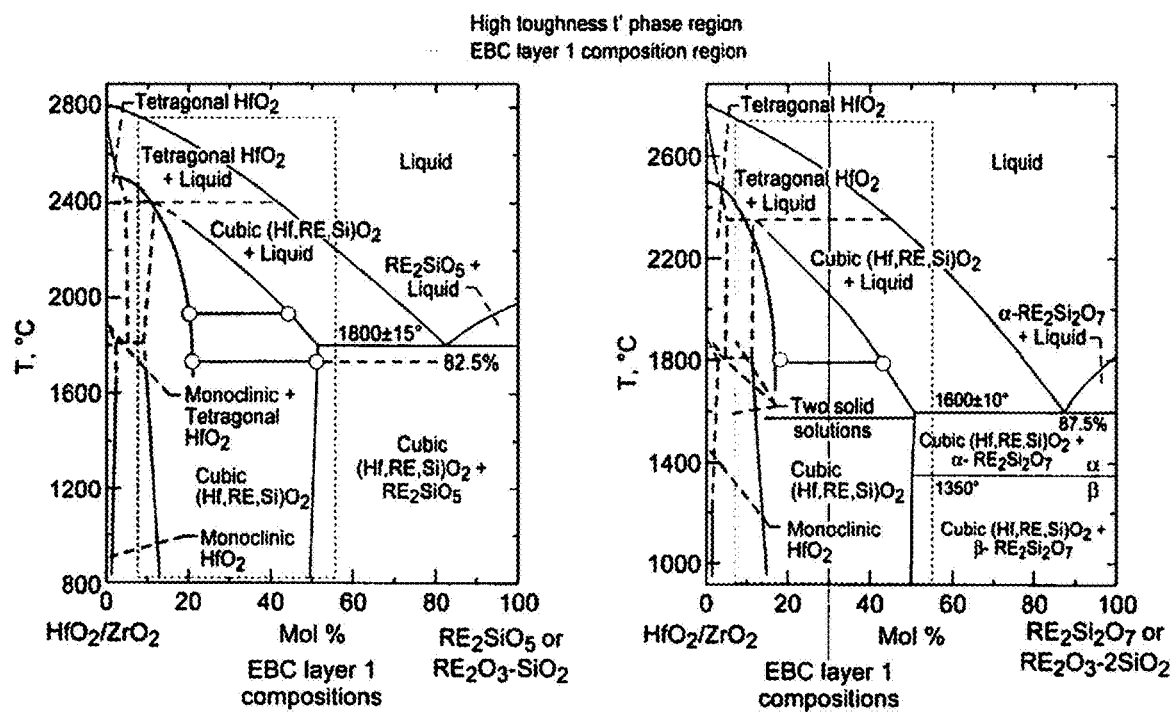
FIG. 14A
FIG. 14B

| Component | Type | Mole Conc. | Conc. |
|---|---|---|---|
| SiO2 | Calc | 57.436 | 21.090 |
| Y2O3 | Calc | 19.443 | 26.831 |
| Gd2O3 | Calc | 7.533 | 16.688 |
| Yb2O3 | Calc | 13.671 | 32.924 |
| HfO2 | Calc | 1.918 | 2.467 |
|  |  | 100.000 | 100.000 |

(EDS Area C)

(EDS Area D)

| Component | Type | Mole Conc. | Conc. | |
|---|---|---|---|---|
| SiO2 | Calc | 9.093 | 2.383 | |
| Y2O3 | Calc | 9.381 | 9.239 | |
| Gd2O3 | Calc | 13.326 | 21.068 | |
| Yb2O3 | Calc | 5.876 | 10.098 | |
| HfO2 | Calc | 62.324 | 57.212 | |
| | | 100.000 | 100.000 | Total |

(EDS Area A)

(EDS Area B)

(EDS Area F)

(EDS Area G)

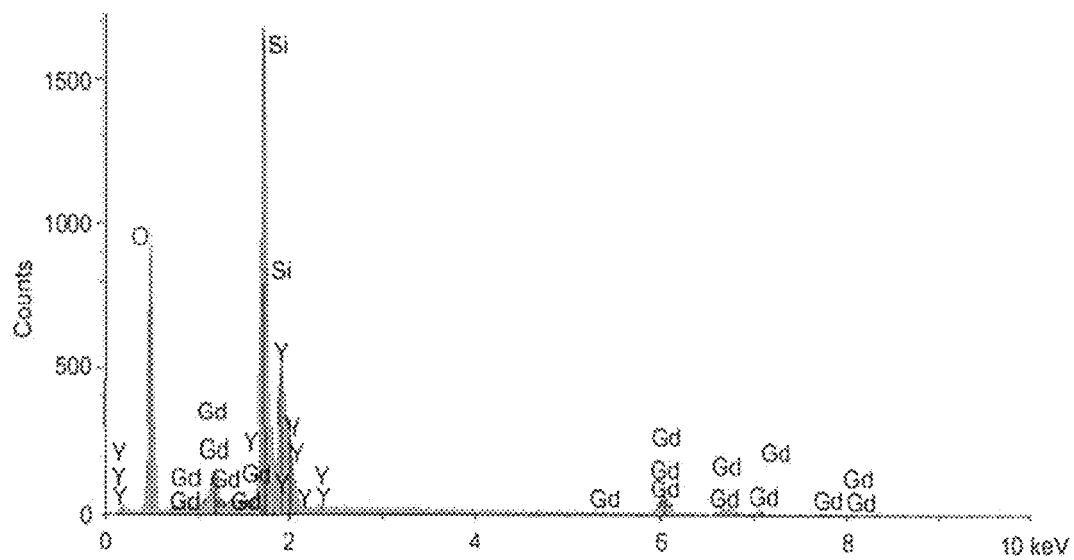
FIG. 25B
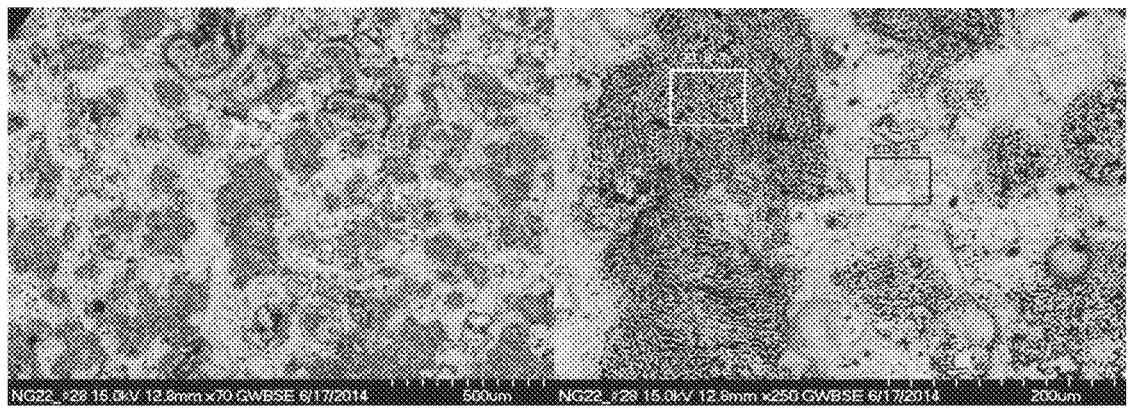
FIG. 25C                                FIG. 25D

ADVANCED HIGH TEMPERATURE ENVIRONMENTAL BARRIER COATING SYSTEMS FOR SIC/SIC CERAMIC MATRIX COMPOSITES

CROSS-REFERENCE TO RELATED APPLICATIONS

This application claims the benefit of U.S. Provisional Patent Application Ser. No. 62/329,500 entitled "Advanced High Temperature Environmental Barrier Coating Systems for SiC/SiC Ceramic Matrix Composites" filed on Apr. 29, 2016 and is a Continuation-In-Part of pending U.S. patent application Ser. No. 13/923,450 entitled "Advanced High Temperature and Fatigue Resistant Environmental Barrier Coating Bond Coat Systems for SiC/SiC Ceramic Matrix Composites" filed on Jun. 21, 2013, which claims the benefit of U.S. Provisional Patent Application Ser. No. 61/663,201 entitled "Advanced High Temperature and Fatigue Resistant Environmental Barrier Coating Bond coat Systems for SiC/SiC Ceramic Matrix Composites" filed on Jun. 22, 2012. The entirety of each of the above-noted applications is incorporated by reference herein.

ORIGIN OF THE INVENTION

The invention described herein was made in the performance of work under a NASA contract and is subject to the provisions of Section 305 of the National Aeronautics and Space Act of 1958, Public Law 85-568 (72 Stat. 435; 42 U.S.C. 2457).

TECHNICAL FIELD

The general field of this innovation is environmental barrier coatings, and embodiments relate more specifically to environmental barrier coatings for silicon-based ceramic components.

BACKGROUND

In components subjected to high temperatures, high velocity combustion gas and corrosive conditions, such as those hot sections of gas turbines and other heat engines, coatings are frequently used to protect such components from those conditions, improving lifespan and reliability. Environmental barrier coating (EBC) systems are thin ceramic layers, generally applied by plasma spraying and/or physical vapor deposition, including Atmospheric and Low Pressure Plasma Spray, Electron Beam-Physical Vapor Deposition (EB-PVD), or Plasma-Spray Physical Vapor Deposition (PS-PVD), and/or other deposition techniques such as High temperature Vacuum Vapor Deposition, Chemical Vapor Deposition, Magnetron or Cathodic Arc Physical Vapor Deposition, Polymer Derived Coatings and Slurry coatings, that are used to protect monolithic ceramic or ceramic matrix composite (CMC) components, from high temperature, water vapor and/or other corrosive combustion gas attacks in gas turbine or other heat engines, and resistant to thermal cycling and mechanical fatigue operating conditions.

Future development in gas turbine engines will necessitate improvements in conventional environmental barrier coatings designed to protect gas turbine engine hot section Si-based ceramic matrix composite (e.g., SiC/SiC CMC) and monolithic (e.g., $Si_3N_4$) ceramic components, in order to meet future engine reduced weight, higher fuel efficiency and lower emission goals. A coating system consisting of a high temperature capable advanced zirconia-based (or hafnia-based) oxide top coat (thermal barrier) and a less temperature capable rare earth silicates and mullite/barium-strontium-aluminosilicate (BSAS)/Si environmental barrier is a state-of-the-art protective T/EBC coating system for the Si-based ceramic applications. The high temperature capability and high stability oxide TBC and lower stability silicate EBC combined system is also the only possible protective coating solution for ceramic components under very high temperature, and/or high gas flow velocity water vapor combustion environments, since the silicate coatings alone cannot effectively protect the component due to the Si species volatility and low temperature capability. In U.S. Pat. No. 7,740,960 to Zhu et al., the entirety of which is incorporated herein by reference, an advanced multilayer graded environmental barrier coating system was disclosed for 3000° F. (1650° C.) environmental barrier coating SiC/SiC turbine ceramic matrix composition applications, including advanced environmental barrier coating top coat, and strain tolerant interlayers, silica activity graded environmental barrier and first generation ceramic and ceramic rare earth silicate based and rare earth aluminosilicate based composite self-healing bond coats.

The developments for advanced turbine environmental barrier coatings will require the advanced environmental barrier coatings capable of achieving 2700°+F (1482° C.) bond coat temperature and 3000° F. (1650° C.) surface temperatures and with thin coating configurations (typically 5-10 mils, overall coating thickness 127-250 micrometers). Additionally, resistance to impact, erosion and thermo-mechanical fatigue are also becoming critical to ensure the environmental barrier coating—CMC system integrity and durability under realistic engine operating conditions. One major issue for the current environmental barrier coating development is the undesirable low temperature capability silicon or silicon containing bond coat systems, which have a melting point of 1410° C. or below. In addition, bond coats should be dense, possess high strength and low oxygen activity to protect the CMC substrates, thus typical ceramics or ceramic compounds will not have the toughness, strength and critical chemical attributes to meet durability requirements under the thermal cyclic and mechanical fatigue loading at high temperature.

In order to develop the next generation high performance, durable 2700° F. (1482° C.) environmental barrier coating systems, advanced high temperature cable strength, non-silicon based bond coats will be needed to advance the next generation turbine engine technologies.

SUMMARY

The following presents a simplified summary of the innovation in order to provide a basic understanding of some aspects of the innovation. This summary is not an extensive overview of the innovation. It is not intended to identify key/critical elements of the innovation or to delineate the scope of the innovation. Its sole purpose is to present some concepts of the innovation in a simplified form as a prelude to the more detailed description that is presented later.

The innovation disclosed and claimed herein, in aspects thereof, comprises systems, methods and articles that can include environmental barrier coating bond coat systems. One example article can include a substrate, such as a SiC/SiC ceramic matrix composite substrate, and a bond coat system. The bond coat system can include a bond coat that can include one or more of a silicon/silicide component or an oxide/silicate component. Optionally, interlayers can be included between the substrate and bond coat and external to the bond coat, and an optional environmental barrier coating top coat can be included external to the bond coat system.

To the accomplishment of the foregoing and related ends, certain illustrative aspects of the innovation are described herein in connection with the following description and the annexed drawings. These aspects are indicative, however, of but a few of the various ways in which the principles of the innovation can be employed and the subject innovation is intended to include all such aspects and their equivalents. Other advantages and novel features of the innovation will become apparent from the following detailed description of the innovation when considered in conjunction with the drawings.

BRIEF DESCRIPTION OF THE DRAWINGS

FIGS. 11A, 11B, and 11C include specific examples of compositions useable in connection with various aspects of the subject innovation.

FIG. 13 is backscattered SEM image showing the graded columnar top of the EBC structure according to an embodiment of the innovation.

FIGS. 14A and 14B are phase diagrams of the EBC layer 1 composition range with examples of rare earth (RE) silicate or silicon doped $HfO_2$ or $ZrO_2$.

FIGS. 25A, 25B, 25C, 25D, and 25E depict SEM images and EDS composition analyses of an initial (Gd,Y)-69 at % Si EBC bond coat system on SiC/SiC after 1500° C. oxidation tests. (a), (c), and (d) depicts an SEM image of surface morphologies at various magnifications. The dark region in the back scattered images shows the $SiO_2$ rich-regions at the bond coat surface. (b) and (e) depict EDS composition analyses showing that the areas A and B have the $SiO_2$ contents of 76 molar % and 53 molar % respectively.

FIG. 26A depicts SEM cross-section microstructures of $HfO_{2-x}$—Si bond coat after 200 h testing at 1500° C., and the examples of Hf, Si, O concentration map region (in atomic percent), based on the EDS analysis.

DETAILED DESCRIPTION

Figure 1:
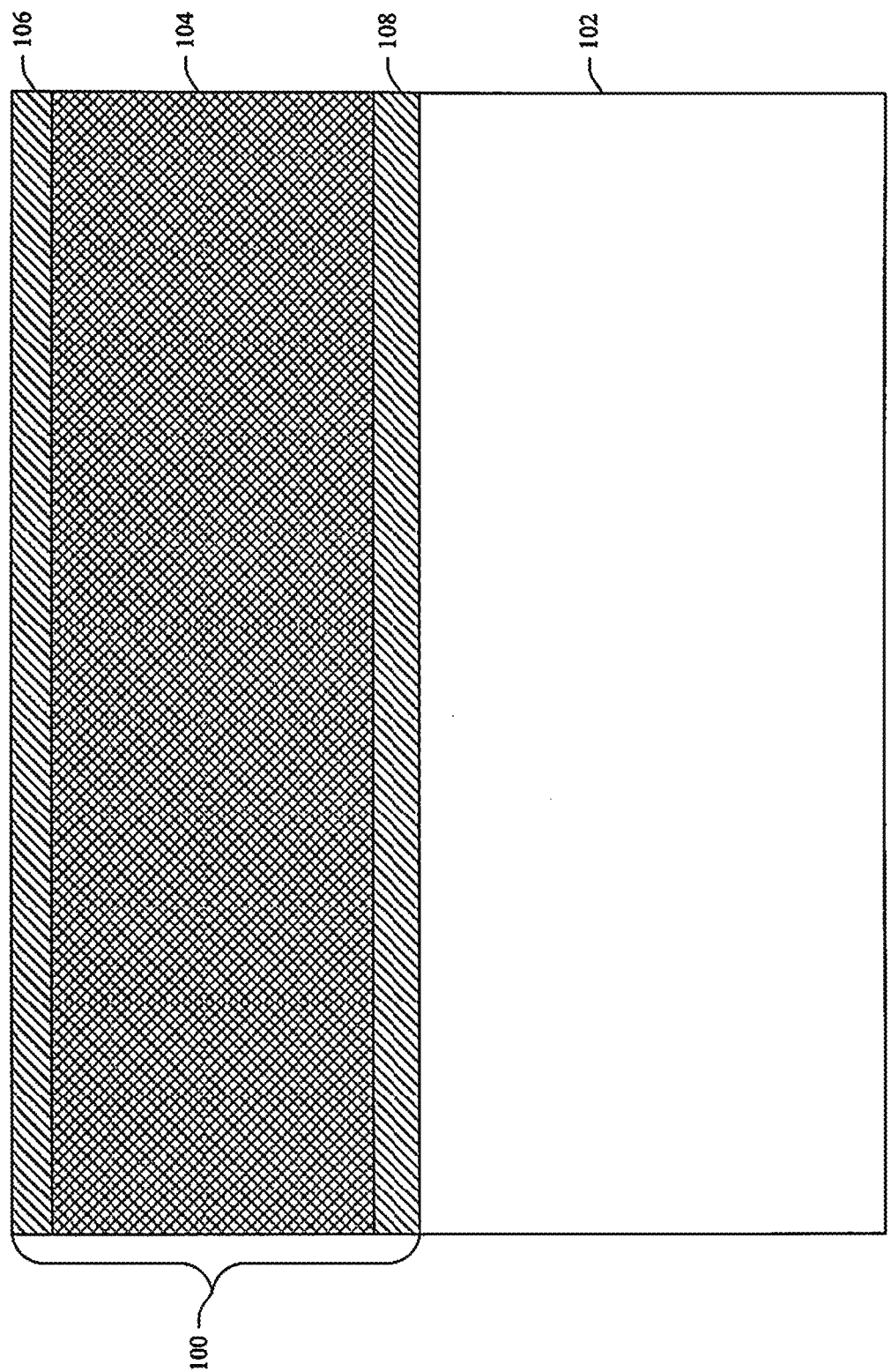
FIG. 1 illustrates a first example environmental barrier coating (EBC) bond coat system in accordance with aspects of the subject innovation.

The innovation is now described with reference to the drawings, wherein like reference numerals are used to refer to like elements throughout. In the following description, for purposes of explanation, numerous specific details are set forth in order to provide a thorough understanding of the subject innovation. It may be evident, however, that the innovation can be practiced without these specific details. In other instances, well-known structures and devices are shown in block diagram form in order to facilitate describing the innovation.

In various aspects, embodiments of the subject innovation can include systems, articles, and methods that can employ an advanced high temperature capable, low expansion and low diffusion environmental barrier coating (EBC) bond coat system for Si-based ceramics and ceramic matrix composites (CMCs). Various aspects of the subject innovation can provide coating compositions and architecture arrangements that can achieve exceptional environmental barrier coating bond coat adhesion, oxidation and fatigue resistance, and environmental protection performance, along with self-healing capabilities that can ensure log-term durability for Si-based turbine ceramic components. Environmental barrier coating bond coat systems, articles, and methods of the subject innovation can be employed in thin environmental barrier coating configurations, which can help enable the realization of ceramic turbine engine SiC/SiC CMC combustor and turbine airfoil applications.

Referring initially to the drawings, FIG. 1 illustrates a first example environmental barrier coating (EBC) bond coat system 100 in accordance with aspects of the subject innovation. The EBC bond coat systems, articles, and methods employed in various aspects of the subject innovation can utilize compositions and architecture designs disclosed herein to enhance the coating high temperature stability, high toughness and strength, and durability performance. The EBC bond coat system 100 is the coating layer directly adjacent to the substrate 102 (e.g., SiC/SiC ceramic matrix composite substrate, etc.), as shown in FIG. 1, which can improve environmental barrier coating adhesion and bonding strength, provide enhanced environmental protection, and, in various aspects of the subject innovation, can be designed to incorporate dynamic slow growth protective scale formation for oxidation resistance and seal healing. EBC bond coat system 100 can include a bond coat 104, which can be as described herein. In various aspects, environmental barrier bond coats 104 of the subject innovation can have any of a range of coating thicknesses, e.g., ranging from around 10 micrometers to around 200 micrometers. Layers 106 and 108, which can be included in some embodiments and can be excluded in other embodiments, can be interlayers, e.g., diffusion barriers with crystalline and/or amorphous coatings as described herein, with the thickness ranging from around around 0.5 micrometers to around 200 micrometers.

EBC bond coat systems in accordance with the subject innovation can comprise one or both of two composition categories, referred to herein as Group A (also referred to herein as an "silicon/silicide component") and Group B (also referred to herein as a "oxide/silicate component"). Group A and Group B have low oxygen activities (or called "oxgen getter") and higher oxygen but lower silica activities, respectively. Members of Group A generally have superior oxidation resistance, while members of Group B generally have superior temperature resistance and combustion environmental resistance. Group A (the "silicon/silicide component") can be an advanced silicon based alloy system as described herein, e.g., a rare earth (RE) based or doped silicon alloy or compound. Rare earth metals that can be employed in connection with group A include Ytterbium, Gadolinium, Neodymium, Samarium, Lutetium, Erbium, Europium, Terbium, Dysprosium, Holmium, Lanthanum, Cerium, Praseodymium, Promethium, Thulium (i.e., lanthanides), plus Yttrium and Scandium; Group A can also include doped Carbide-Nitrides of these. Group B (the "oxide/silicate component") can include highly stable Oxide and Silicate based material systems described herein. Various embodiments can employ any of a variety of silicon/silicide components, or any of a variety of oxide/silicate components, or a combination of both. In some embodiments, bond coats of the subject innovation can include $HfO_2$ (or $ZrO_2$, etc.) and Si/alloyed/doped Si, optionally with various dopants as described herein. Various embodiments of bond coats of the subject innovation incorporating $HfO_2$ and Si or their alloys have been demonstrated to have excellent temperature and environmental resistance, including resistance to CMAS (Calcium Magnesium Aluminoresistance, Silicate) attack.

EBC bond coats in accordance with the subject innovation can have advanced multi-component compositions, which can be arranged to form thermodynamically stable, multiscale composites that have superior performance as compared to the current state of the art silicon bond coat. Bond coat systems and articles in accordance with the subject innovation can have thermal expansion co-efficients in a range from $4\times10^{-6}$ to $6\times10^{-6}$ m/m·K, comparable to the Si-based ceramics, and conventional Silicon bond coats. Coatings of the subject innovation can be processed consistent with any of the current state-of-the-art coating processing methods.

In contrast to conventional systems, embodiments of the subject innovation can comprise systems articles and methods that can utilize multi-component bond coat systems, which can include one or more of alloy doped Silicon; alloy-doped or silicon-rich Rare Earth (RE) Silicides; Rare Earth (RE) doped transition metal Silicides; Nitrogen, Boron or Carbon doped metal Silicon alloys or compounds; or advanced oxides or silicates. Embodiments of the subject innovation can form highly stable bond coat systems useable in connection with SiC/SiC CMC components.

Group A (the "silicon/silicide component") useable in connection with bond coat systems disclosed herein, can include (a) Rare Earth doped or alloyed Silicon, (b) Rare Earth (RE) Silicides (e.g., any of various stoichiometry compounds, such as $RE_5Si_3$, $RE_5Si_4$, $RESi$, $RE_3Si_5$, $RESi_2$, etc. and also particularly non-stoichiometry silicide compound compositions disclosed herein for optimum performance enhancement), which can include Ytterbium Silicides, Yttrium Silicides, Gadolinium Silicides, Erbium Silicides, etc., (c) Rare Earth (RE) Silicides doped with Zirconium, Hafnium, Aluminum or a combination thereof, (d) Rare Earth (RE) doped refractory transition metal Silicides, which can include Rare Earth (RE) doped or alloyed Zirconium Silicides, Hafnium Silicides, Tantalum Silicides, Titanium Silicides, Chromium Silicides, Iron Silicides, Molybdenum Silicides, Niobium Silicides, Aluminum Silicides, etc., (e) Rare Earth (RE) or Aluminum doped Palladium, Irridium and Platinum Silicides; (f) Rare Earth (RE) doped or non-doped Tantalum-, Titanium-, Chromium-, Molybdenum-, Niobium-, Aluminum-Silicon Carbon, Boron, Nitride compounds with Silicon, such as $Ti_x(AlCrTa)_ySi$—CN, $Ti_x(AlCrTa)_ySi$—BN, $Ti_2CrTa(Si)$—N, ZrTaSi—N, HfTaSiCN, or $Ta_2AlSi$—CN, etc.; or (g) any combinations of any of the foregoing. The Group A can be doped or oxidized with minor "oxygen" dopant or with oxygen gradients.

Group B (the "oxide/silicate component") useable in connection with bond coat systems disclosed herein can significantly improve the temperature capability, environmental stability and strength capability, and can include (a) Rare Earth (RE) oxides (e.g., $RE_2O_3$), which can include Ytterbium Oxide, Yttrium Oxide, Gadolinium Oxide, Europium Oxide, etc.; (b) Rare Earth Mono-Silicates ($RE_2SiO_5$) or Di-Silicates ($RE_2Si_2O_7$) such as $Yb_2SiO_3$, $Yb_2Si_2O_7$, $Y_2SiO_5$, $Gd_2Si_2O_7$, $Gd_2SiO_5$ and $Gd_2Si_2O_7$; (c) other oxides such as Barium Oxide (BaO), Strontium Oxide (SrO), etc.; (d) Titanium and Tantalum-doped and un-doped Rare Earth Zirconium and Hafnium Pyrochlore Oxides such as $RE_2Zr_2O_7$ and $RE_2Hf_2O_7$; (e) Rare Earth Aluminum Garnets (REAG or $Y_3Al_5O_{12}$, such as YAG, YbAG), Rare Earth Aluminum Monoclinics (REAM, such as YAM, YbAM) or Rare Earth Aluminum Perovskites (REAP or $REAlO_3$, such as YAP, YbAP); (f) Zirconium Oxide ($ZrO_2$) or Hafnium Oxide ($HfO_2$, e.g., t' Hafnium Oxide, monoclinic Hafnium Oxide, etc.), or Rare Earth (RE) Oxide Doped $ZrO_2$ or $HfO_2$, or Transition Metal doped, and/or $SiO_2$ doped or alloyed $ZrO_2$ and $HfO_2$; or (g) any combinations of any of the foregoing. Silicates of Group B can include both rare earth rich compounds and silica ($SiO_2$) rich compounds.

Referring again to FIG. 1, in various embodiments, each of layer 106 and layer 108 can be a diffusion barrier, which in one embodiment can be a thin crystalline and/or amorphous coating of a silicon/silicide component (e.g., a member of Group A), which can have the capability of operating at temperatures of at least 1600° C. (2912° F.), and can have ultra low oxygen and water vapor diffusivity. In various embodiments either or both of 106 (near the EBC top coats/bond coat interface) and layer 108 (near the bond coat/CMC interface) can comprise an extremely thin layered low diffusional coating, and can incorporate, utilizing a higher silicon content than bond coat 104, high temperature capable amorphous or crystalline phased $Ta_xSiCN$, $RETa_xSiCN$, $Ti_x(AlCrTa)_ySiCN$, or other compositions from Groups A or B. As mentioned above, in some embodiments, layers 106 and 108 can be included, while in other embodiments they can be omitted. In the example embodiment shown in FIG. 1, bond coat 104 can be a multicomponent doped bond coat, comprising a silicon/silicide component (e.g., from Group A).

Figure 2:
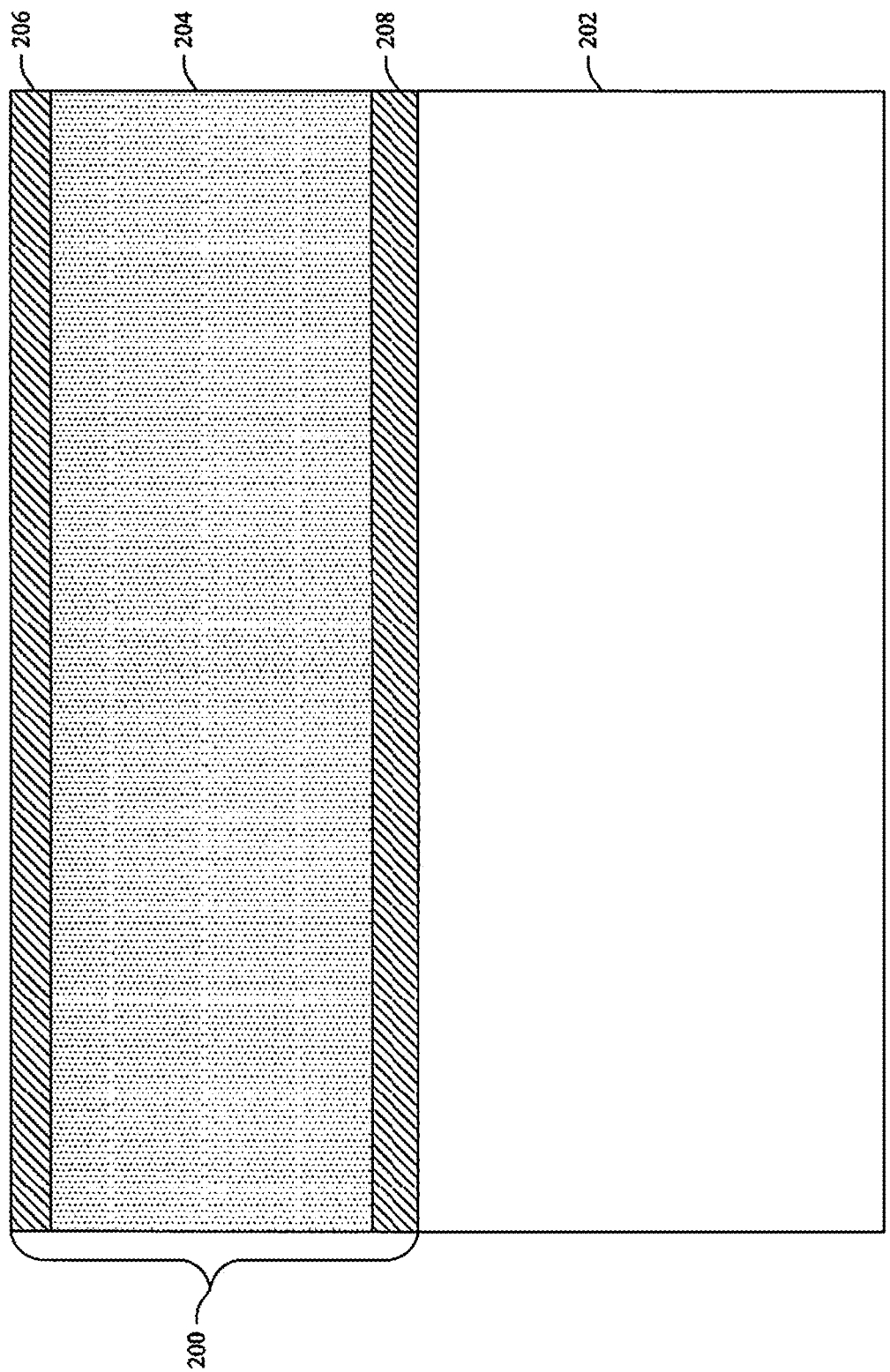
FIG. 2 illustrates a second example EBC bond coat system in accordance with aspects of the subject innovation.

FIG. 2 illustrates a second example EBC bond coat system 200 in accordance with aspects of the subject innovation. Substrate 202 and layers 206 and 208 (which can be optional, as with EBC bond coat system 100) can be as described elsewhere herein in connection with analogous components, e.g., those of FIG. 1. Bond coat 204 can be a multicomponent doped bond coat, comprising an oxide/silicate component (e.g., from Group B). Thus, in various embodiments, members of Group A or Group B, either individual members or combination thereof, can be used for EBC bond coats, as shown in FIGS. 1 and 2.

Figure 3:
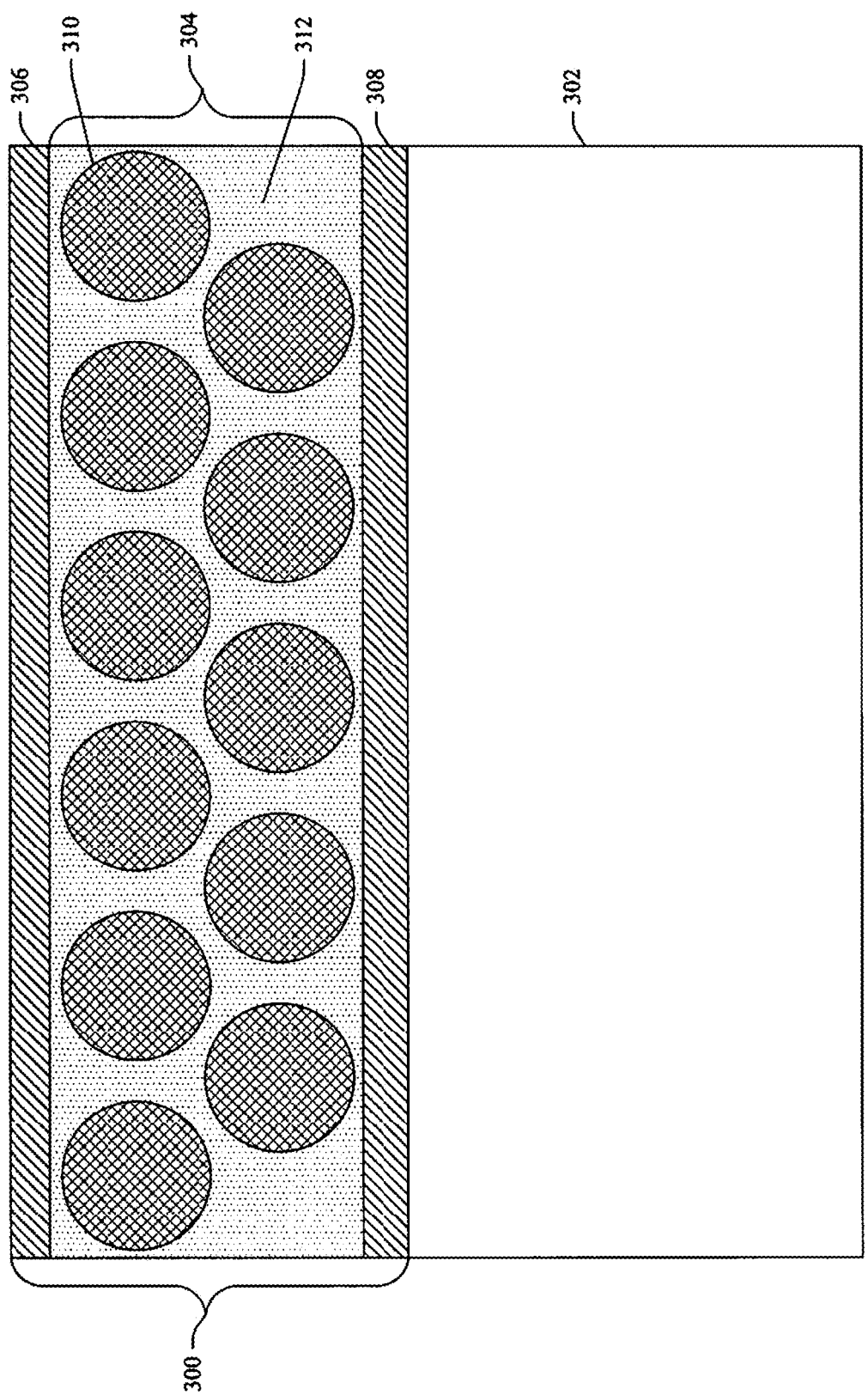
FIG. 3 illustrates a third example EBC bond coat system in accordance with aspects of the subject innovation.

Turning to FIG. 3, illustrated is a third example of an EBC bond coat system 300 comprising a composite bond coat 304 in accordance with aspects of the subject innovation. Substrate 302 and layers 306 and 308 can be as described above in connection with FIGS. 1 and 2 (with layers 306 and 308 again optional). Bond coat 304 can comprise a composite of both a silicon/silicide component (e.g., from Group A) and an oxide/silicate component (e.g., from Group B), such as an oxide/silicate component (e.g., from Group B) as reinforcements 310 and embedded in a layer 312 composed of a silicon/silicide component (e.g., from Group A) or vice versa, as shown in bond coat 304. As examples of silicon/silicide components useable in connection with bond coat 304, of the Rare Earth Silicides, dopants such as Aluminum can ensure superior cyclic and oxidation resistance under lower temperature conditions, which can prevent "pesting" from occurring. The combination of components from both Group A and Group B can provide superior integrity and performance for the bond coat, via the sophisticated composite system of an Oxide-Silicate in combination with a Silicon alloy. An extremely thin layered low diffusional coating near the bond coat/substrate (e.g., CMC) interface at 308, and a similar layer near the EBC top coat/bond coat interface at 306, can be incorporated, and can utilize a higher silicon content, high temperature capable amorphous or crystalline phased $Ta_xSiCN$, $RETa_xSiCN$, $HfRETa_xSiCN$, $Ti_x(AlCrTa)_ySiCN$, for example, or other members or combinations thereof selected from Groups A and B.

Figure 4:
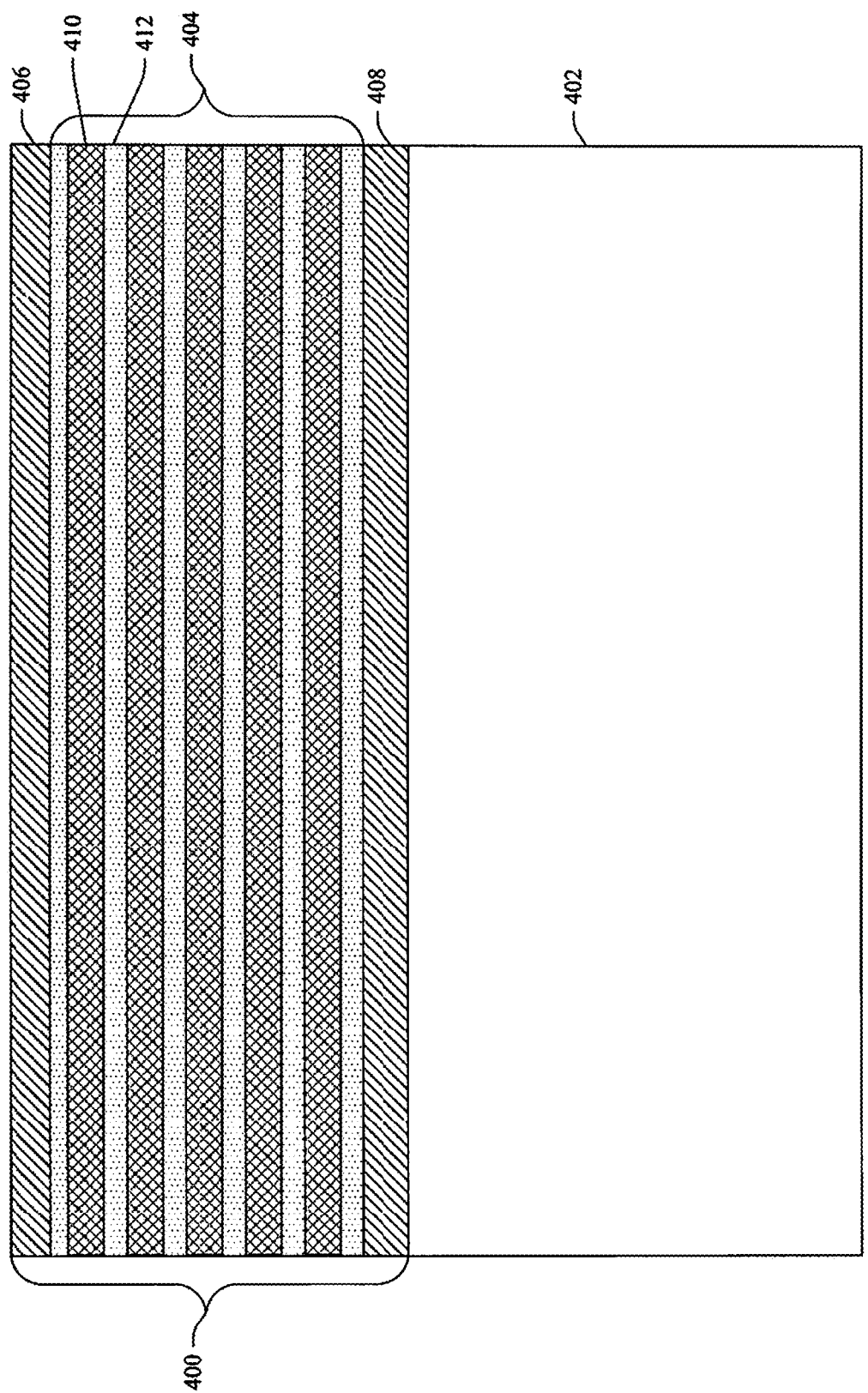
FIG. 4 illustrates a fourth example EBC bond coat system in accordance with aspects of the subject innovation.

FIG. 4 illustrates a fourth example embodiment of an EBC bond coat system 400 comprising a layered composite bond coat 404 in accordance with aspects of the subject innovation. Substrate 402 and layers 406 and 408 can be as described in connection with similar components of FIGS. 1, 2, and 3. Bond coat 404 can be arranged in a layered composite configuration with alternating layers 410 and 412 of a silicon/silicide component and an oxide/silicate component, or vice versa. In other aspects, more than two alternating layers can be employed. EBCs, when included, can be as described herein, for example, comprising a high stability multicomponent $HfO_2$-$RE_2O_3$—$SiO_2$/$RE_2Si_{2-x}O_{7-2x}$; in other embodiments, other components described herein can be used additionally or alternatively in connection with environmental barrier coats.

In various embodiments of the innovation, silicon/silicide components (e.g., from Group A) can be employed that can have relatively high silicon content designs (silicon-rich, off-stoichiometry silicide compositions) to provide superior oxidation resistance. In embodiments employing doped Silicon alloys or Silicides, such high silicon content can correspond to silicon molar concentration in a range from 50 to 99.5 molar %. For embodiments employing Rare Earth Silicides and other doped Silicide embodiments, silicon-rich silicides such as $RE_3Si_5$ and $RESi_2$ can provide such a relatively high silicon content, for example, and also $RE_3Si_{5+x}$ and $RESi_{2+x}$, where the "x" indicates a modified composition with the silicon rich silicides for superior performance.

Figure 5:
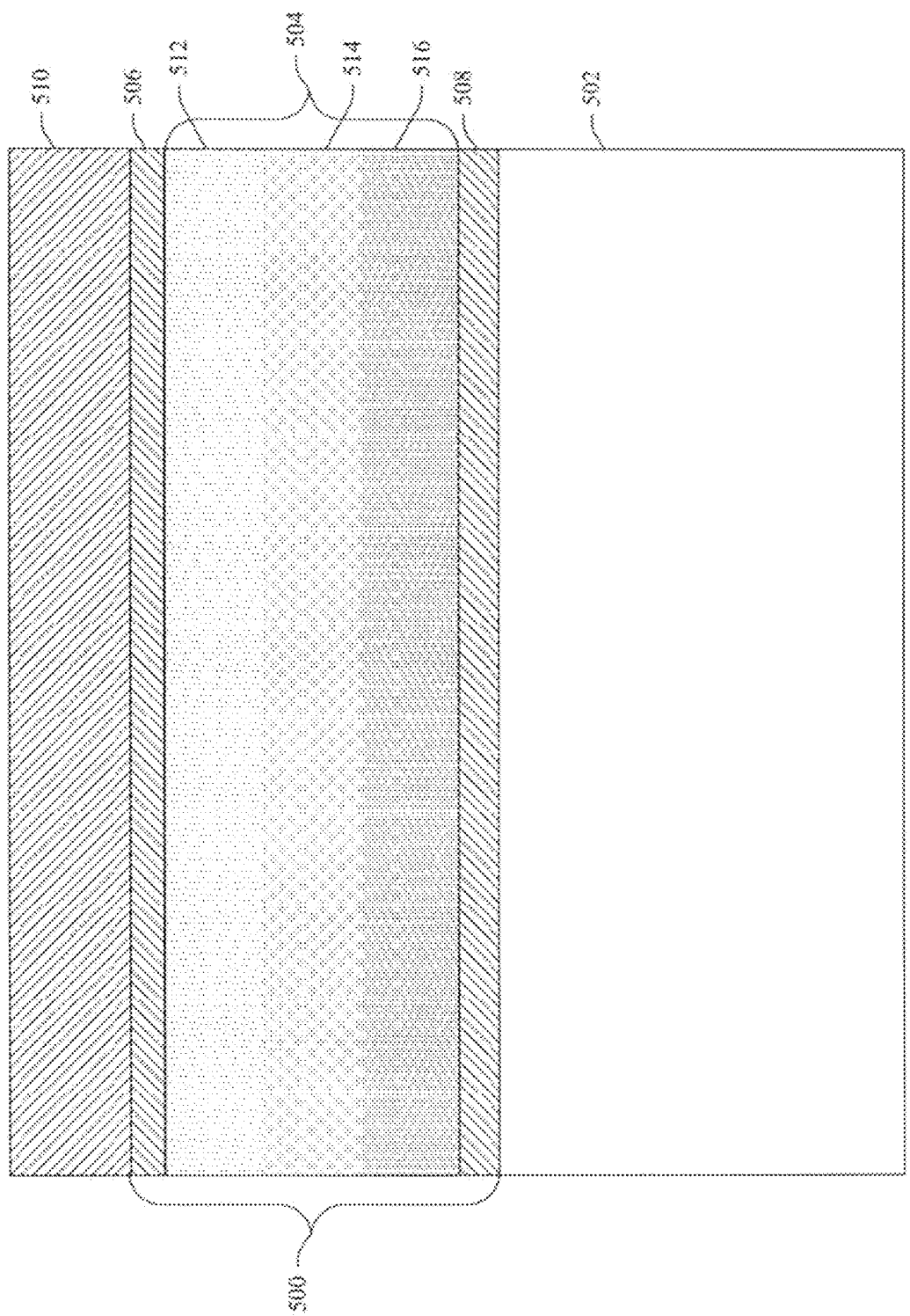
FIG. 5 illustrates an example embodiment of an EBC bond coat system comprising a bond coat with a mixture phased region, in accordance with aspects of the subject innovation.

FIG. 5 illustrates an example embodiment of an EBC bond coat system 500 comprising a bond coat 504 with a mixture phased region, in accordance with aspects of the subject innovation. Substrate 502 and layers 506 and 508 can be as described in connection with other embodiments (again, layers 506 and 508 can be optional). FIG. 5 also shows a thermal and environmental barrier coating (T/EBC) 510, which can be optionally included in any embodiments described herein. Bond coat 504 can comprise a mixture phased region 512-516 of increasing silicon or silica content or silica activity at portions of bond coat 504 closer to the substrate 502 (e.g., CMC) when compared with portions more distant from substrate 502. The mixture phased region is indicated in FIG. 5 by three sub-regions 512, 514, and 516, although greater or fewer sub-regions can be included in various embodiments, or continuous variation in silicon or silica content or activity can be employed, etc. One example embodiment employed a mixture phased region of RESi, or RESi(O), $RE_3Si_5$ or $RE_3Si_5$(O) and $RESi_2$(O), with the silicon concentration between 50 and 67 molar %, and can provide excellent temperature capability and oxidation resistance. Various embodiments can have a silicon molar concentration in the range from 62 to 70%. Other embodiments of the subject innovation can have atomic percentages for silicon between 55 and 95%, or between 60 and 90%, or between 65 and 95%, etc. Silicon-rich bonded Silicide composites can provide coatings with excellent temperature capability and durability. In the $Ti_x(AlCrTa)_ySi$ and $Ti_x(AlCrTa)_ySi$—(C)N type coating systems, high silicon concentration (e.g., up to 60 molar %) can produce coatings with extremely high temperature capability (1600-1700° C.), exceptional mechanical properties, and low diffusivity amorphous coating formation.

Bond coats that comprise both a silicon/silicide component (e.g., from Group A) and an oxide/silicate component (e.g., from Group B) can provide for a coating with capability. The oxide/silicate component (e.g., refractory metal or rare earth oxides or silicates, etc.) can further protect the silicon/silicide component from oxidation, can improve the coating strength and toughness, creep and fatigue resistance, and can prevent the coating from "Pesting" in certain lower temperature conditions. The advanced RE and RE doped Silicon or Silicide of Group A and the oxide-silicate compositions of Group B can also enhance the bond coat self-healing in the event cracking develops, and can also provide excellent oxidation and combustion environment protection under extreme environments.

Figure 6:
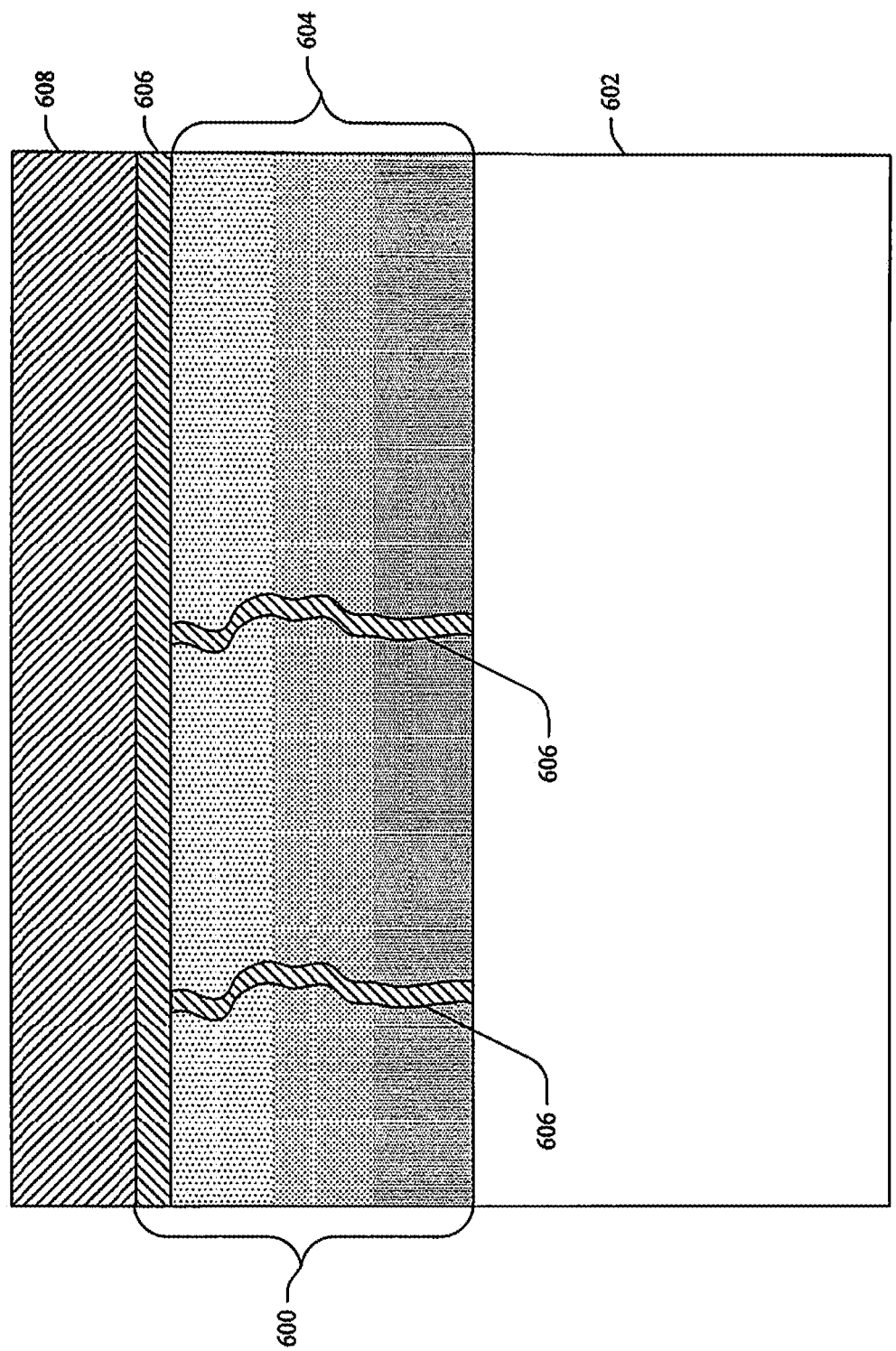
FIG. 6 illustrates an example bond coat system with self-healing in accordance with aspects of the subject innovation.

FIG. 6 illustrates an example bond coat system 600 with self-healing in accordance with aspects of the subject innovation. The substrate 602 can be as described elsewhere herein, and thin layers diffusion barriers can be included, although not shown in FIG. 6. Bond coat 604 can be any of a variety of bond coats as described herein, although the bond coat illustrated is similar to that illustrated in connection with FIG. 5. Bond coat 604 can comprise a silicon/silicide component, an oxide/silicate component, or a combination of the two, and can have a graded composition as described above in connection with mixture phased region 512-516 of FIG. 5, with increased Silicon or Silica activity, and reduced oxygen activity toward the interface between bond coat 604 and substrate 602 (e.g., SiC—SiC ceramic or CMC substrate, etc.). Bond coat 604 is capable of self-healing cracks and self-growth of a low silica activity and high stability EBC, as shown at 606. Optionally, a thermal and environmental barrier coating (T/EBC) top coat 608 can be included, but it need not be included in all embodiments, due to the ability of bond coat 604 to self-grow an EBC for superior stress and fatigue resistance.

In various aspects of the subject innovation, environmental barrier coating bond coat systems described herein can employ any of a variety of compositions and architectures described herein. Experimental results obtained in connection with embodiments of EBC bond coat systems useable in connection with Si-based ceramic and CMC component applications have demonstrated higher temperature capabilities and durability than state-of-the-art coatings in laboratory simulated engine environments. Various aspects and embodiments of bond coating systems disclosed herein have been successfully tested and demonstrated at the sub-element and sub-component levels.

In various aspects, embodiments can employ an oxide-Si bond coat as described herein, in combination with an RE silicate or RE aluminosilicate EBC. Interlayers in such an embodiment can comprise $RE-HfO_2/ZrO_2$-aluminosilicate layered coatings. Various high stability coatings can be employed in various aspects of the innovation, which can include one or more of RE oxide doped $HfO_2/ZrO_2$, pyrochlores ($RE_2Zr_2O_7$—$RE_2Zr_2O_7$), perovskites (e.g., $RE-SrZrO_3$, etc.), magnetoplumbites (e.g., $REMgAl_{11}O_{19}$, etc.), or RE-Hafnia plus RE aluminosilicate composite coatings.

In aspects, embodiments of the subject innovation can also comprise other coats that can form an EBC system, such as top coats described herein. For example, top coats of the subject innovation can employ various materials, such as those of the form $RE-HfO_2$—X, $RE-HfO_2$-graded Silica, $RE-HfO_2$-Alumino Silicate, etc. Top coats can be applied via EB-PVD or other suitable techniques, such as EB-PVD $HfO_2-RE_2O_2$, etc.

As described above, coats and coat systems of the subject innovation can be applied via a variety of techniques, such as applied by Electron Beam-Physical Vapor Deposition (EB-PVD), Plasma-Spray Physical Vapor Deposition (PS-PVD), Plasma-Spray—Thin Film (PS-TF), High temperature Vacuum Vapor Deposition, Chemical vapor Deposition, etc. In one example, coatings comprising multicomponent RE silicate/$HfO_2$-RE-Silicate with distinct vapor pressures can be applied via EB-PVD with co-deposition. In another example, PS-PVD and/or PS-TF coating processes can be employed, with PVD splat coating processing at low pressure (e.g., around 1 torr, etc.). For complex-shape components, high velocity vapor and non-line-of-sight coating processing can be employed. PS techniques used herein can employ a high enthalpy plasma vapor stream for efficient and complex thin film coating processing.

What follows is a more detailed discussion of certain systems, methods, and apparatuses associated with aspects of the subject innovation. To aid in the understanding of aspects of the subject innovation, theoretical analysis and experimental results associated with specific experiments that were conducted are discussed herein. However, although for the purposes of obtaining the results discussed herein, specific choices were made as to the selection of various aspects of the experiments and associated setups such as testing temperatures, durations, and environmental conditions the systems and methods described herein can be employed in other contexts, as well. For example, various aspects of the subject innovation can be utilized to protect ceramic components in gas turbines or other engines, whether air-based, land-based, etc. In some embodiments, different selections of component materials for coatings can be selected than those used in the experiments discussed herein, and may have differing characteristics, as explained in greater detail below.

Figure 7:
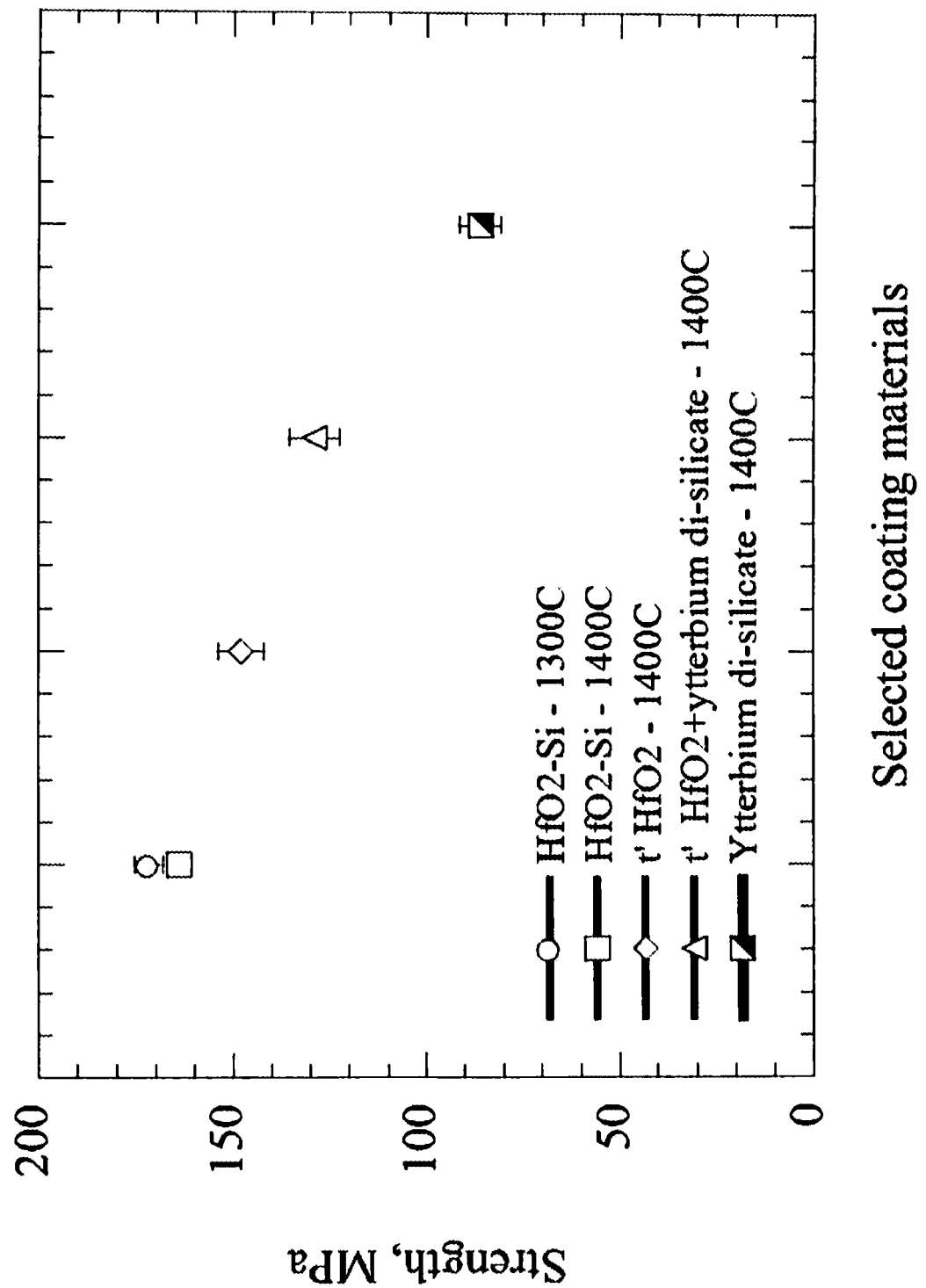
FIG. 7 illustrates the high temperature strength of several tested bond coat materials useable in aspects of the subject innovation.
Figure 8:
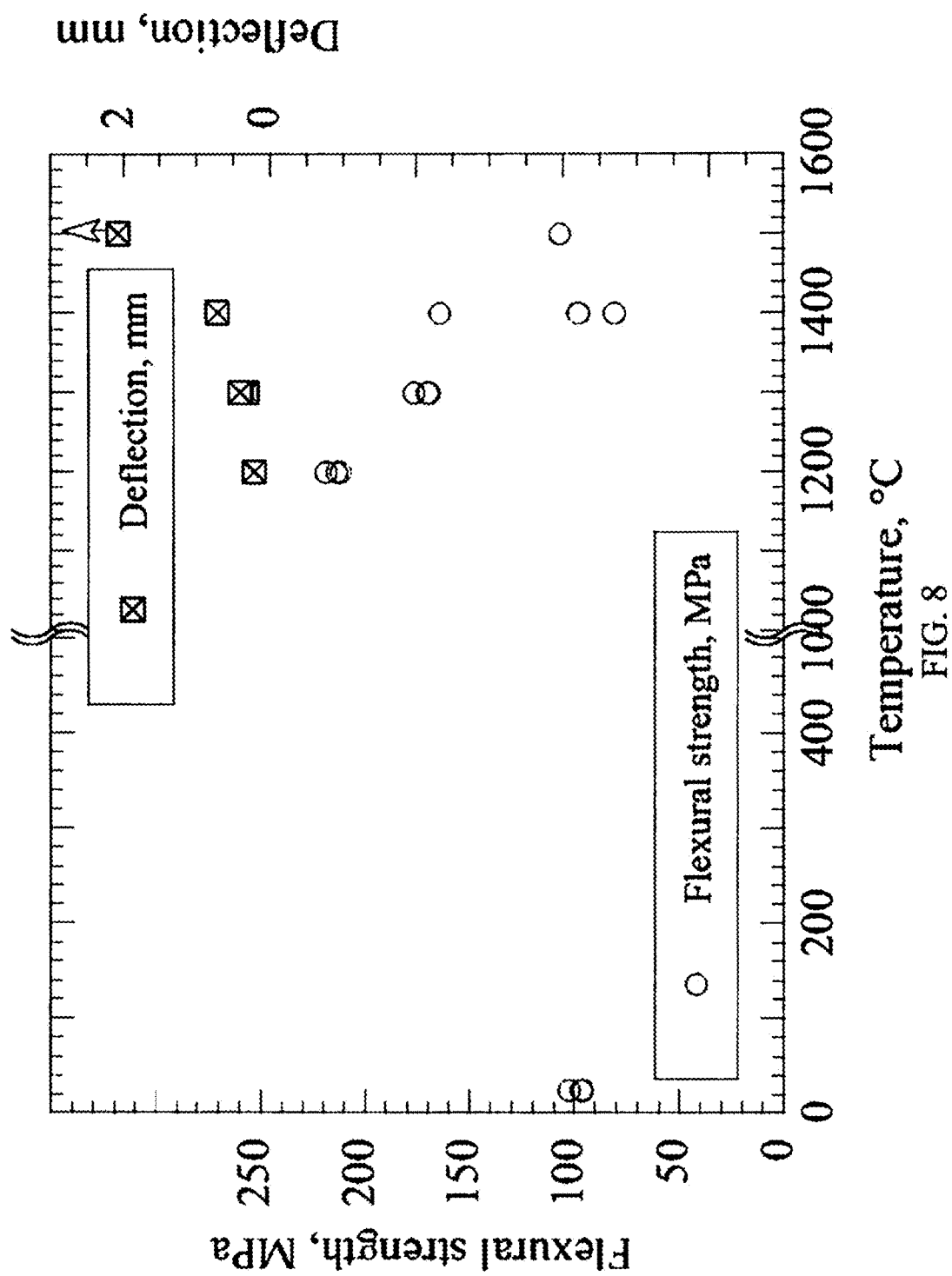
FIG. 8 illustrates the flexural strength and deflection of $HfO_2$—Si bond coat materials useable in aspects of the subject innovation at various temperatures.
Figure 9A:
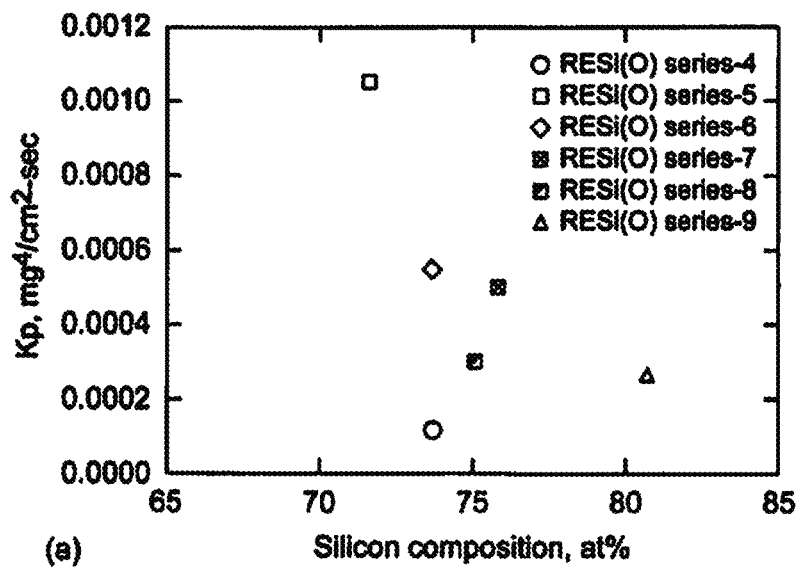
FIG. 9 illustrates testing results for RESi(O)-based bond coats.
Figure 9B:
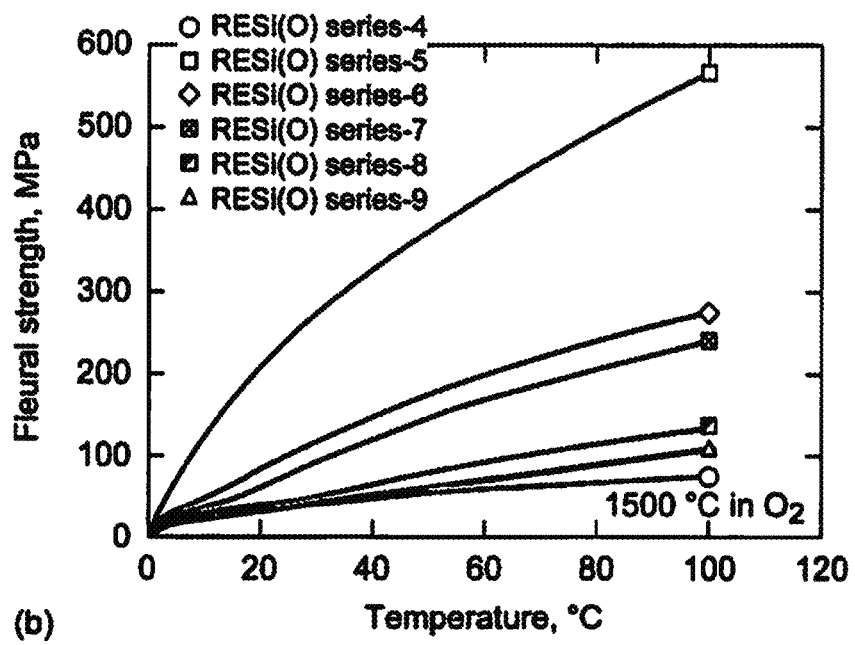
Figure 10:
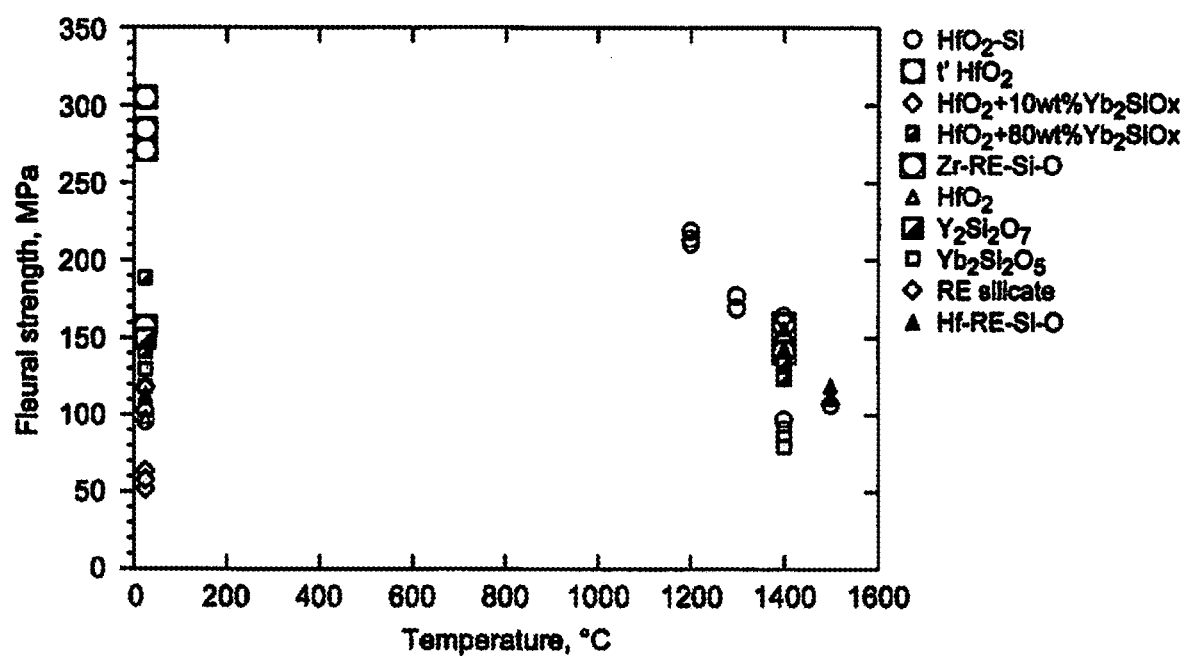
FIG. 10 illustrates flexural strength for various bond coats of the subject innovation at room temperature and elevated temperatures.

FIG. 7 illustrates the high temperature strength of several tested bond coat materials useable in aspects of the subject innovation. FIG. 8 illustrates the flexural strength and deflection of $HfO_2$—Si bond coat materials useable in aspects of the subject innovation at various temperatures. Compared with conventional systems, the bond coat systems of the subject innovation have excellent strength and toughness. Other tested bond coats included RESiO+X (Ta, Al, Hf, Zr, etc.) bond coats, RESi+X bond coats, Zr/Hf—RE-Si bond coats, etc. FIG. 9 illustrates testing results for RESiO-based bond coats, showing a Silicon concentration range that can provide for improved oxidation resistance at 1500° C. FIG. 10 illustrates flexural strength for various environmental barrier bond coats of the subject innovation at room temperature and elevated temperatures.

Several specific examples of coats and coat systems were developed as example embodiments of the innovation disclosed herein. These examples are included herein for the purposes of illustration; however, the subject innovation is not limited to these specific examples, but can include other embodiments that vary from these specific examples in one or more aspects.

As a first set of specific examples, coatings in accordance with various aspects of the subject innovation can comprise (a) Silicon cladded $HfO_2$ (e.g., agglomerated or sinter crushed $HfO_2$ powders, which can be at or near a 30:70 weight ratio of Si:$HfO_2$); (b) Yttrium monosilicate, with approximately a 50:50 molar ratio of $Y_2O_3$ and $SiO_2$ (i.e., around 78.984% weight and 21.016% weight, respectively); (c) Silicon cladded ytterbium monosilicate plus minor t' $HfO_2$ (e.g., in a weight ratio of approximately 30:60:10 of Si:Ytterbium monosilicate:t' $HfO_2$); (d) Silicon cladded ytterbium monosilicate (e.g., in a weight ratio of approximately 30:70 of Si:Ytterbium monosilicate); (e) Silicon cladded t' low k $ZrO_2$ plus ytterbium silicate (e.g., with a 30:30:40 weight ratio of Si:t' $ZrO_2$:ytterbium monosilicate); (f) Yttrium silicide cladded t' low k $ZrO_2$ plus ytterbium silicate (e.g., with a 30:30:40 weight ratio of Si:t' $ZrO_2$:ytterbium monosilicate); or (g) Compound t' $ZrO_2$—$HfO_2$ (with RE) plus ytterbium silicate approximately as in table 1:

TABLE 1

| Oxide | $ZrO_2$ | $HfO_2$ | $Y_2O_3$ | $Yb_2O_3$ | $Gd_2O_3$ |
|---|---|---|---|---|---|
| Mole % | Balance | 20 | 1.5 | 1.5 | 1.5 |
| Wt % | 62.077 | 28.090 | 2.260 | 3.944 | 3.628 |

As additional specific examples, bond coats in certain embodiments can comprise (a) Silicon with 30% atomic weight of Ytterbium; (b) alternating and co-deposition of 50% $Gd_2O_3$ with Si plus 30 at. % Yb and 50% $Yb_2O_3$ with Si plus 30 at. % Yb; or (c) a composite bond coat of $HfO_2$ with Si plus 30 at. % Yb. The thickness of these example bond coats can be in the range of 3 to 5 mils, although greater or lesser thicknesses can be used in various embodiments. In other examples, certain embodiments of bond coat systems can comprise (a) Silicon with 15% atomic weight of Gadolinium; (b) alternating and co-deposition of 50% $Gd_2O_3$ with Si and 50% $Yb_2O_3$ with Si; or (c) a composite bond coat of $HfO_2$ with Si plus 15 at. % Gd. As a second EBC layer, an alternating layer system can be employed with a total thickness of around 10 mils. A bottom system (of thickness around 5 mils) can be included that alternates between (a) $HfO_2$ (5% molar, 6.086% weight), $Y_2O_3$ (5% molar, 6529% weight), $Gd_2O_3$ (5% molar, 20.962% weight), $Yb_2O_3$ (25% molar, 45.576% weight), with co-deposition of $SiO_2$ (60% molar, 20.847% weight) and (b) $HfO_2$ (96% molar, 90.7333% weight), $Y_2O_3$ (2% molar, 3.464% weight), $Gd_2O_3$ (1% molar, 2.780% weight), and $Yb_2O_3$ (1% molar, 3.023% weight). A top system can be included (also of thickness around 5 mils) that alternates between (a) $HfO_2$ (30% molar, 27598% weight), $Y_2O_3$ (5% molar, 4.934% weight), $Gd_2O_3$ (5% molar, 7.921% weight), $Yb_2O_3$ (30% molar, 51.669% weight), with co-deposition of $SiO_2$ (30% molar, 7.878% weight) and (b) $HfO_2$ (96% molar, 90.7333% weight), $Y_2O_3$ (2% molar, 3.464% weight), $Gd_2O_3$ (I % molar, 2.780% weight), and $Yb_2O_3$ (1% molar, 3.023% weight). $SiO_2$ grading can be used with both. As with other specific examples provided herein for the purposes of illustration, it is to be appreciated that the chemical compositions can vary from the specific ratios provided, while remaining within the scope of the subject innovation.

FIGS. 11A, 11B, and 11C include other specific examples of compositions useable in connection with various aspects of the subject innovation; again, these examples are provided for purposes of illustration, and are not intended to be limiting.

The subject innovation, in various embodiments, can provide bond coat systems that can be critical for future development of advanced high performance gas turbine engine applications. The environmental barrier bond coating system is one of the most critical technologies that can lead to the future realization of SiC/SiC CMC turbine engine combustor liners and vanes, and turbine blades, allowing the engines to be operated at much higher temperatures with significantly reduced cooling requirements. This technology can be also used in a variety of other settings in which ceramic components will be subjected to extreme temperature or environmental conditions, such as land-based stationary gas turbines for power generation, and other energy related heat engine systems.

According to an aspect, the innovation includes an environmental barrier coating (EBC) system utilizing an innovative composition and architecture design. The advanced environmental barrier coating system of the innovation is designed to significantly enhance the coating and Si-based component temperature stability, strength and toughness, and durability performance under various high temperature operating conditions. The coating system of the innovation is particularly suitable for being used for the high temperature SiC/SiC and C/SiC components envisioned for turbine engines, rocket engines and/or other high temperature and high heat flux operating environments.

As depicted in FIG. 12, in one embodiment the advanced environmental barrier coating system may comprise a bond coat layer 730 and two environmental barrier coating layers (EBC layer 1 700 and EBC layer 2 720). The bond coat layer 730 is adjacent to a ceramic substrate 740, including SiC/SiC, C/SiC ceramic matrix composite substrates. In one embodiment, the bond coat layer is immediately adjacent to the ceramic substrate. In one embodiment, there may be only one EBC layer. In another embodiment, the EBC layer 1 700 and EBC layer 2 720 may be chemically identical or may be different.

In another embodiment, the environmental barrier coating system may include an optional intermediate EBC layer 710 between the EBC layer 1 700 and EBC layer 2 720 (FIG. 12).

In one embodiment, the innovation comprises a multi-component bond coat system than can include alloyed and oxygen co-doped silicon; alloyed and oxygen co-doped and silicon-rich rare earth (RE) silicide; rare earth (RE) doped transition metal silicides; and nitrogen, boron and carbon doped silicon alloy and compounds, along with advanced oxides and silicates and that can be utilized for forming highly stable, low thermal expansion bond coat systems for SiC/SiC CMC components.

According to the innovation, EBC layer 1 (EBC top layer) may be designed with a ceramic alloy composition having a high melting point (up to about 2800° C.+). Suitable ceramic alloys include $HfO_2$ or $ZrO_2$ based ceramic alloy compositions, and rare earth oxides (e.g., $RE_2O_3$). In one embodiment, the rare earth oxide is selected from $Yb_2O_3$, $Gd_2O_3$, $Yb_2O_3$, $Nd_2O_3$, $Lu_2O_3$, $Gd_2O_3$, $Lu_2O_3$, $Nd_2O_3$; along with $Y_2O_3$ and $SiO_2$ dopants and their alloys. Rare earth silicates (e.g., $RE_2SiO_5$ or $RE_2Si_2O_7$) can also be used, but these compositions have a lower melting point (typically can be below 1600° C. in particular when impurities are present or reacting with various EBC constituents), which is a critical design consideration for high temperature coating systems. Other suitable compositions include $Al_2O_3$, $Ta_2O_3$, $TiO_2$, CaO, MgO, or combinations of two or more thereof.

In one embodiment of the innovation, the EBC layer 1 can be processed with various processing methods, including, but not limited to, Electron Beam-Physical Vapor Deposition (EB-PVD), chemical vapor deposition (CVD), and plasma spray. For turbine airfoil applications, the EB-PVD based methods, with the thin and smooth surface and columnar structures, are particularly useful due to their excellent high heat flux resistance, along with improved erosion, impact and road sand or volcanic ash (often referred as Calcium-Magnesium-Alumino-silicate or CMAS) corrosion resistance.

According to an aspect of the innovation, the environmental barrier coating system may include a graded columnar structure. See FIGS. 12 and 13. In one embodiment, the graded columnar structure may comprise $HfO_2$— and $ZrO_2$— based ceramic alloy compositions, with increased cluster rare earth oxide 705 and reduced silica ($SiO_2$) dopant compositions near the coating outer surface regions and/or the outer columnar shells for improved CMAS and erosion resistance. The EBC layer 1 surface inter-column phases or matrix and columnar core preferably have tetragonal (t') low rare earth dopant compositions. Examples of suitable tetragonal t' phase dopants concentration range can be 05-20 molar %. As shown, for example, in FIGS. 14A and 14B.

Figures 12A, 12B:
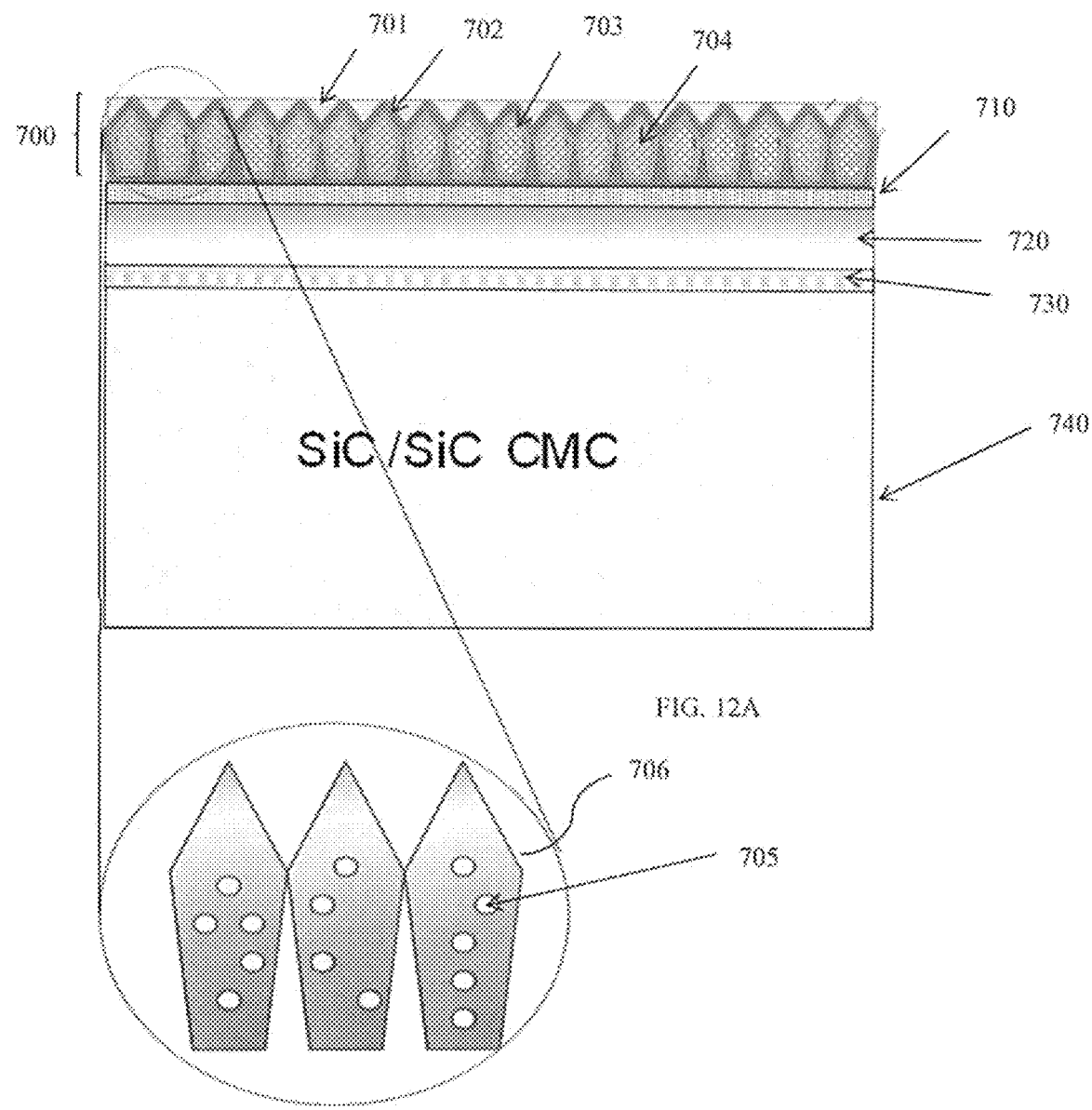
FIG. 12A is a schematic representation of an EBC structure according to an embodiment of the innovation.
FIG. 12B is a magnification of a portion of the EBC structure of FIG. 12A.
Figure 15A:
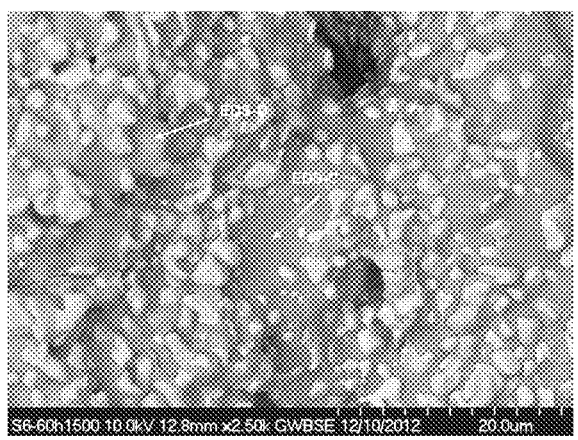
FIGS. 15A, 15B, and 15C depict example EBC compositions and analyses thereof. (a) is an SEM image from an EBC system tested 60 hr at 1500° C.; (b) is an energy dispersive spectroscopy (EDS) composition analysis of an EBC structure according to the present innovation; (c) is an EDS composition analysis of a different EBC structure according to the present innovation.
Figure 15B:
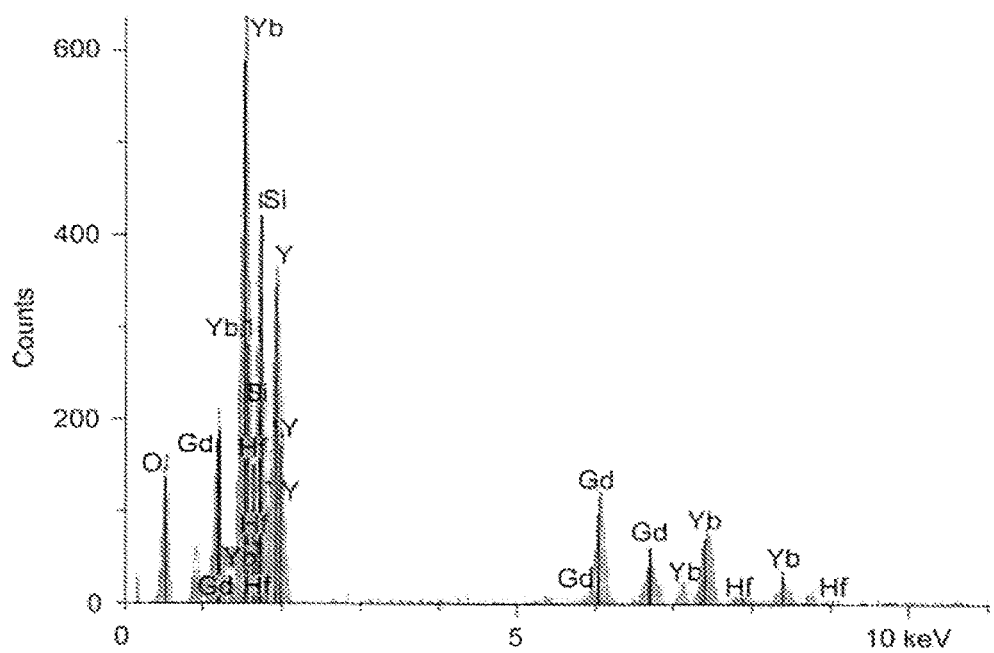
Figure 15C:
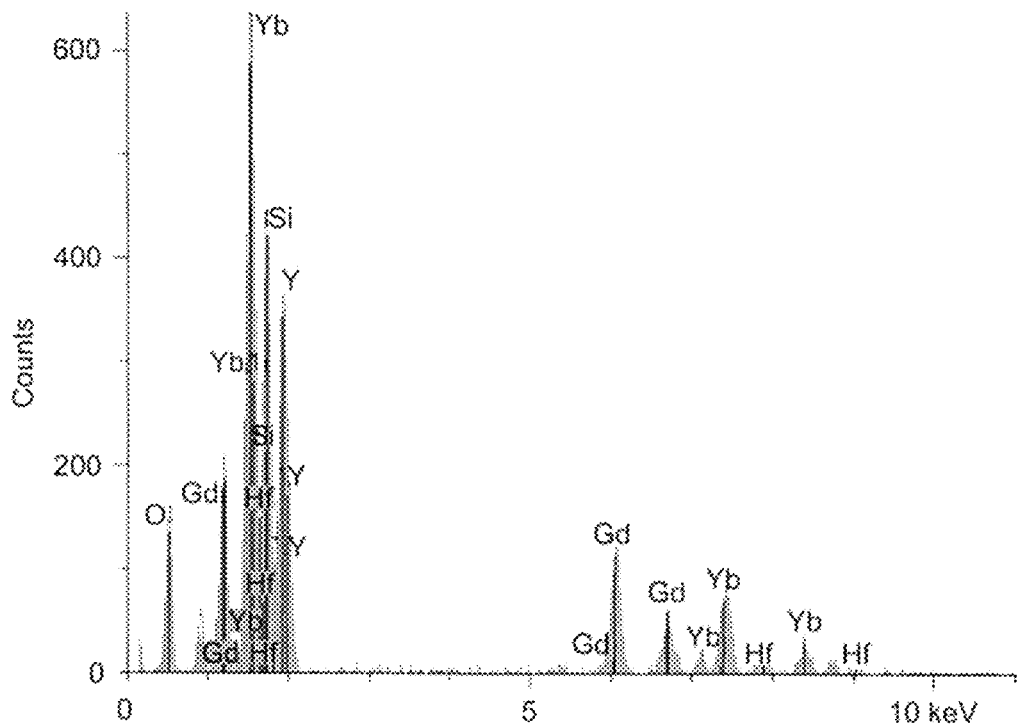
Figure 16A:
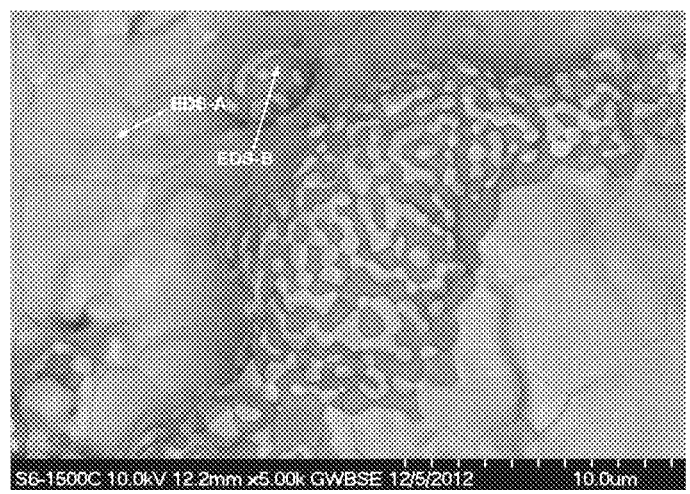
FIGS. 16A, 16B, and 16C depict another example EBC compositions and analyses thereof. (a) is an SEM image from an EBC system tested 60 hr at 1500° C.; (b) is an energy dispersive spectroscopy (EDS) composition analysis of an EBC structure according to the present innovation; (c) is an EDS composition analysis of a different EBC structure according to the present innovation.
Figure 16B:
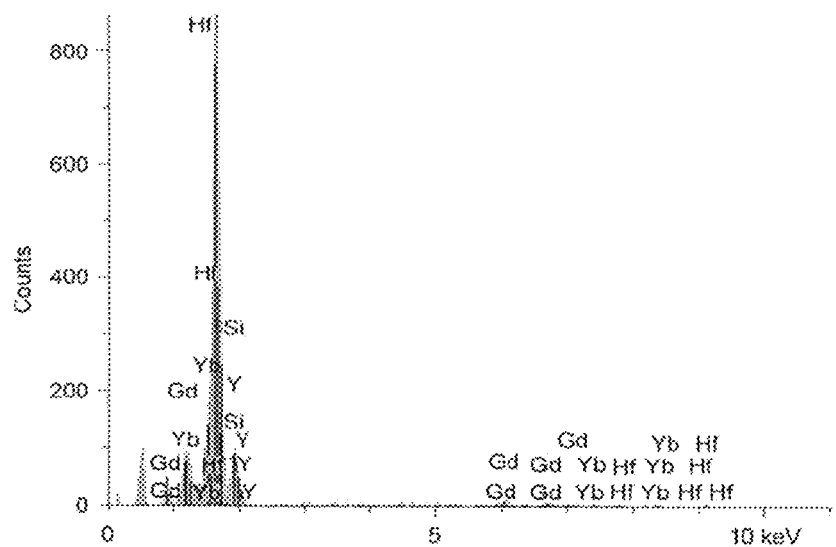
Figure 16C:
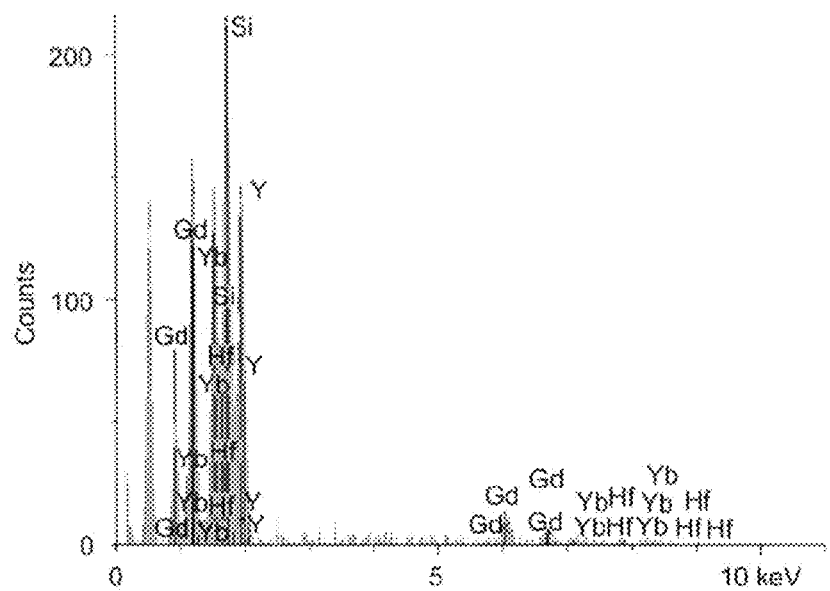
Figure 17:
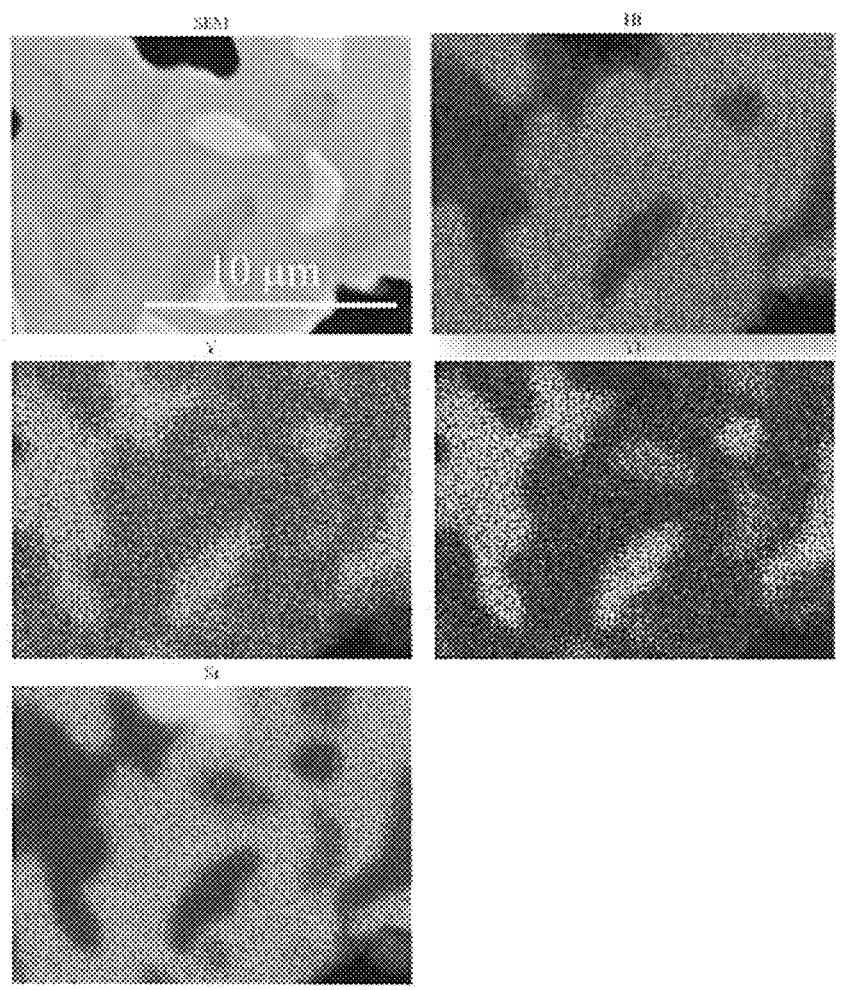
FIG. 17 depicts an example of hafnium-rare earth Oxide-$SiO_2$ (hafnium rare earth silicate) SEM EBC microstructure image and EDS concentration maps of Hf, Y, Yb, and Si, tested after 300 hr at 1500° C.

These compositions may provide intrinsically higher melting point and tougher material phase systems, as shown in FIG. 12B. The EBC layer 1 may include graded or layered dopants 706 and/or cluster rare earth dopants 705. An EB-PVD processed EBC layer 1 is shown in FIG. 13. The EBC layer 1 rare earth and $SiO_2$ dopants can also be graded in order to maximize the coating surface temperature capabilities.

As depicted in FIG. 12, according to one aspect of the innovation, the environmental barrier coating comprises an EBC layer 1 700 comprising a matrix 701, high cluster rare earth dopant, low $SiO_2$ activity shells 702, rare earth silicate subshells 703, and toughened t' core grains 704; an interlayer 710 (which is optional); an EBC layer 2 720; an EBC bond coat layer 730. The EBC bond coat layer 730 is adjacent to the substrate 740 (e.g., SiC/SiC CMC).

FIG. 12A is a schematic representation of an embodiment of the EBC system of the innovation. The EBC system has high toughness, high stability, high melting phase and durable EBC structures. FIG. 12B is a magnified portion of the schematic for the EBC layer 1 graded composition design. FIG. 13 is a backscattered SEM image showing the graded columnar top EBC. In one embodiment, alternating composition layered structures related to the $SiO_2$ content variations can also be incorporated (the dark region corresponding higher $SiO_2$ content) to control the coefficients of thermal expansion (CTE), CMAS, and erosion and impact resistance. See FIG. 13.

In one embodiment, the EBC layer 1 is designed $ZrO_2$ and/or $HfO_2$ compositions, with at least one rare earth oxide (e.g., $RE_2O_3$) in an amount of about 10 to about 30 molar %. The EBC layer 1 may be simultaneously co-doped with a composition of silica ($SiO_2$) in molar percent ratios in the range of about 1:1 or about 1:2 as to the rare earth contents. In one embodiment, the rare earth oxide (e.g., $RE_2O_3$) can be partially substituted by $Y_2O_3$ for controlling $SiO_2$ concentrations and solubility. The EBC layer 1 composition range is illustrated in FIGS. 14A and 14B.

FIGS. 14A and 14B are phase diagrams of the EBC layer 1 composition range with examples of rare earth (RE) silicate or silica-doped $HfO_2$ or $ZrO_2$. Rare earth doped $HfO_2$ or $ZrO_2$ is expected to have high toughness cluster t' and rare earth silicate toughened coating systems, with high environmental stability, high strength, low thermal expansion coefficients matching with the CMC substrates. The phase compositions with clustered co-doped $HfO_2$ and rare earth mono-silicate will have higher temperature capability and stability, and also with excellent CMAS resistance.

In one embodiment of the innovation, a supersaturated solution may be designed and achieved using the above-described range of coating compositions and high temperature processing such as electron beam-physical vapor deposition (EB-PVD), plasma spray processing, and/or hot process processing. The supersaturated compositions may be used for various coating microstructure designs, for helping achieve a single phase structure for superior temperature capability and durability (e.g., t' phase), or for designing a nano-cluster or two-phase/multi-phase composition systems for lower thermal conductivity, thermomechanical and environmental stability, creep and fatigue resistance, and for further improving the low expansion phase structures of the hafnium-rare earth silicate EBC compositions.

In one embodiment, the hafnium-rare earth oxide-$SiO_2$ (hafnium rare earth, silicates) coating layer compositions can be controlled with high strength, high toughness and high stability corrosion resistant (such as CMS resistant), low grain boundary oxygen and water vapor permeability due to the low Sits, content and activities.

The EBC layer 1 can be processed with the Electron Beam-Physical Vapor Deposition (EB-PVD) processing type columnar structures, particularly for turbine airfoil; applications. In one embodiment, the composition ranges are as shown in the phase diagrams depicted in FIGS. 14A and 14B. A higher toughness composition range in the shadowed area of the phase diagrams will be processed, with dopants concentration toward the coating layer 1 surface, and also towards columnar outer surfaces for improved durability and prime reliant designs.

According to one aspect of the innovation, the coating composition design may include the use of multi-component rare earth oxide dopants. In one embodiment, small and large rare earth combinations may be used to enhance the high temperature strength and other thermophysical and thermomechanical properties of the coating. Suitable small and large rare earth combinations include ionic size cluster dopants such as $Yb_2O_5$ and $Gd_7O_3$; $Yb_2O_3$ and $Nd_2O_3$; and $Gd_2O_3$; $Lu_2O_3$ and $Nd_2O_3$; along with $Y_2O_3$ and $SiO_2$ dooms and their alloys. The cluster dopant designs are effective for improving the coating performance and CMS resistance.

According to an aspect of the innovation, EBC layer 2 may be designed with rare earth silicate compositions, such as $RE_2SiO_5$ and $RE_2Si_2O_7$, particularly including, hut not limited to, $Yb_2SiO_5$ and $Yb_2Si_2O_7$, $Gd_2SiO_5$ and $Gd_2Si_2O_7$, or $Y_2SiO_5$ and $Y_2Si_2O_7$, Use of these compositions may promote the alternate multiple component rare earth clustered silicates. The design has allowed the selectively higher rare earth dopant concentrations of different ionic sizes preferentially segregated near the grain boundaries to help implement the tougher lower rare earth dopant content grain and coating columns cores to enhance the toughness and temperature capability. In particular, t' $HfO_2$, t' $ZrO_2$ or a combination of t' $HfO_2$—$ZrO_2$ may be finely clustered in the EBC matrix grain boundaries to reduce diffusion and creep. This design may also increase the strength of the environmental barrier coating systems. Examples of the $HfO_2$ strengthened EBC systems are shown in FIGS. 15A-C and 16A-C.

Figure 18:
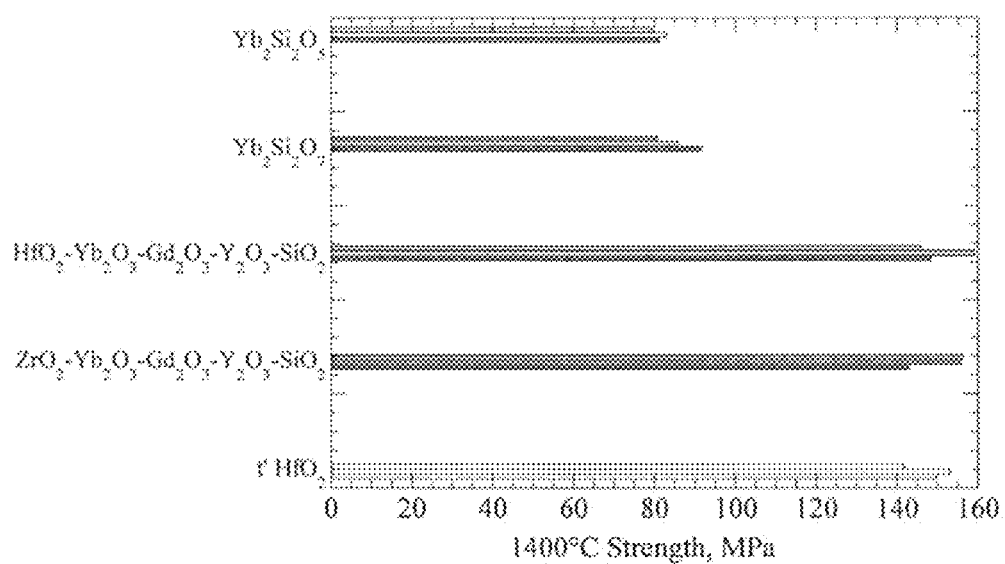
FIG. 18 depicts a bar graph showing high temperature strength testing results determined from hot-pressed specimens at 1400° C.

In one embodiment, the EBC system is a multicomponent, single phase or clustered high toughness t' phase formation of $HfO_2$ or $ZrO_2$ (or alloys of $HfO_2$—$ZrO_2$) in high rare earth dopants (~20 to 30 molar % average dopants). The resulting EBC compositions possess high toughness and high environmental stability coating systems. The $HfO_2$-multicomponent rare earth silicates have improved high temperature strengths, as shown in FIG. 18.

In one embodiment, the innovation includes a composition having $HfO_2$-(2-10) molar %; $RE_2O_3$-(2-10) molar % $SiO_2$, or $HfO_2$-(2-10) molar % $RE_2Si_2O_5$, for achieving the useful strength, stability and high melting points of the EBC systems. A $ZrO_2$ based system and system based on the combination of $ZrO_2$—$HfO_2$ can also be designed with the above 2-10 molar % $RE_2O_3$-(2-10) molar % $SiO_2$ or 2-10 molar % $RE_2Si_2O_5$ for improved performance.

Figure 19A:
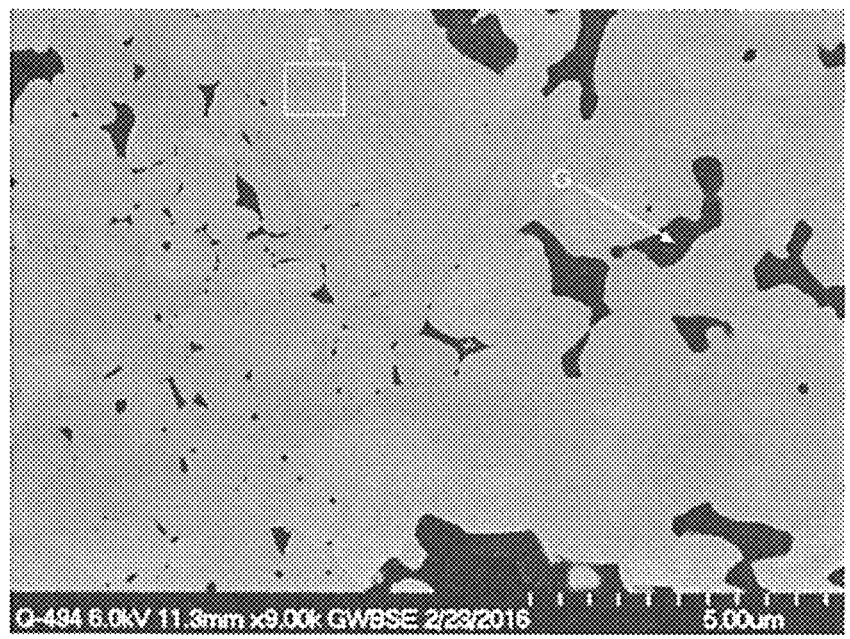
FIGS. 19A, 19B, and 19C depict another example EBC compositions and results showing the 1600° C. processed $HfO_2$—$SiO_2$-low dopant $RE_2O_3$ stable phase equilibria between $HfO_2$-2 molar % $RE_2O_3$-0.2 molar % $SiO_2$ with $HfO_2$-19.7 molar % $SiO_2(Hf_{0.8}Si_{0.2}O_2$ or $Hf_{1.6}Si_{0.4}O_4)$, as shown by the experimental results. (a) depicts an SEM microstructure of a $HfO_2$, with low rare earth dopant, low $SiO_2$ EBC; (b) depicts an EDS Area F analysis report.—showing t' phase $HfO_2$; (c) depicts an EDS Area G: analysis report—showing a low $SiO_2$ concentration hafnia silicate.
Figure 19B:
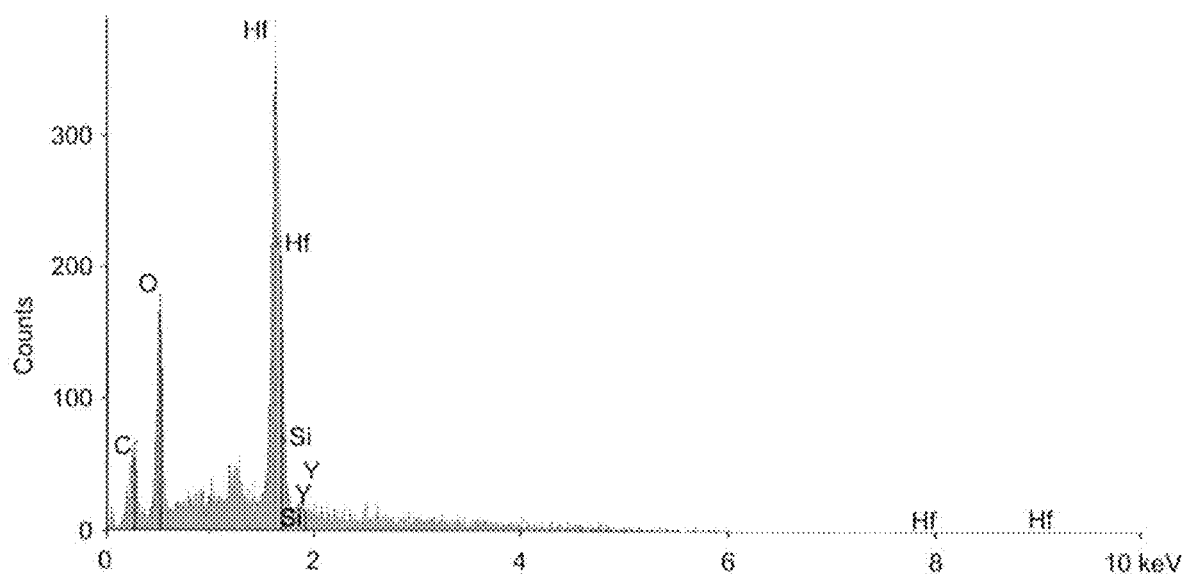
Figure 19C:
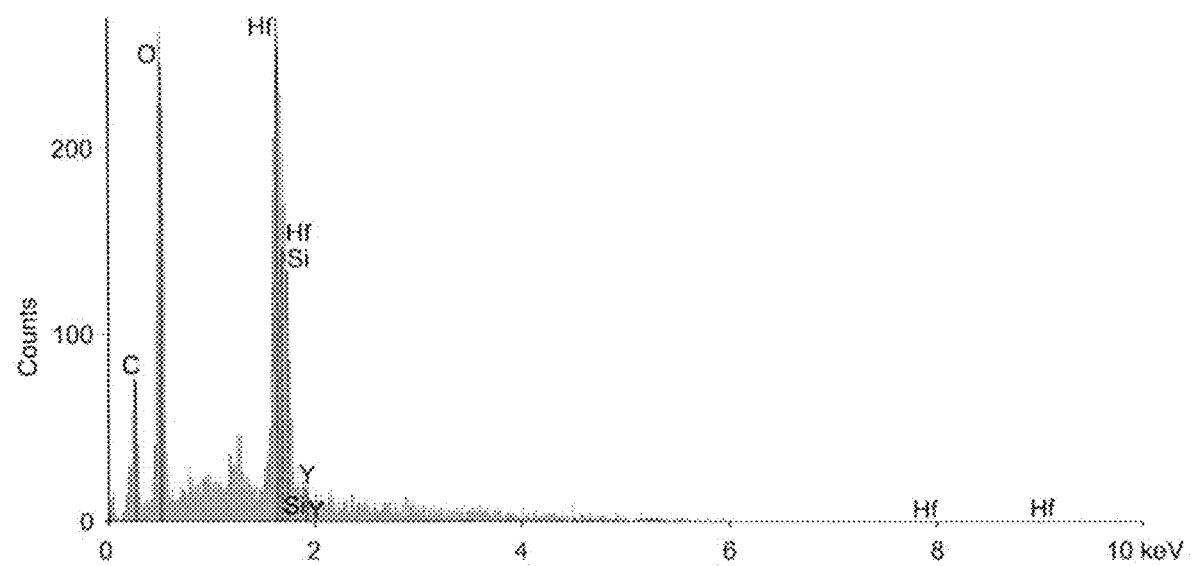

In one aspect of the innovation, the EBC system comprises a non-stoichiometry, highly stable $HfO_2$—$SiO_2$ compound or nano-cluster composition range, with $HfO_2$—X molar % $SiO_2$ (X is less than 50 molar %), preferably $HfO_2$-(0.2-30) molar % $SiO_2$, with and without the typical rare earth dopants, for achieving low thermal expansion, environmental stability and for superior cyclic durability, in particular compared to the typical less stable $HfO_2$-50 molar % $SiO_2$ ($HfSiO_4$). FIGS. 19A-19C shows SEM and EDS results of a 1600° C. processed $HfO_2$—$SiO_2$ with low dopant $RE_2O_3$ EBC in stable phase equilibria between $HfO_2$-2 molar % $RE_2O_3$-0.2 molar % $SiO_2$ with $HfO_2$-19.7 molar % $SiO_2$($Hf_{0.8}Si_{0.2}O_2$ or $Hf_{1.6}Si_{0.4}O_4$).

Figure 20:
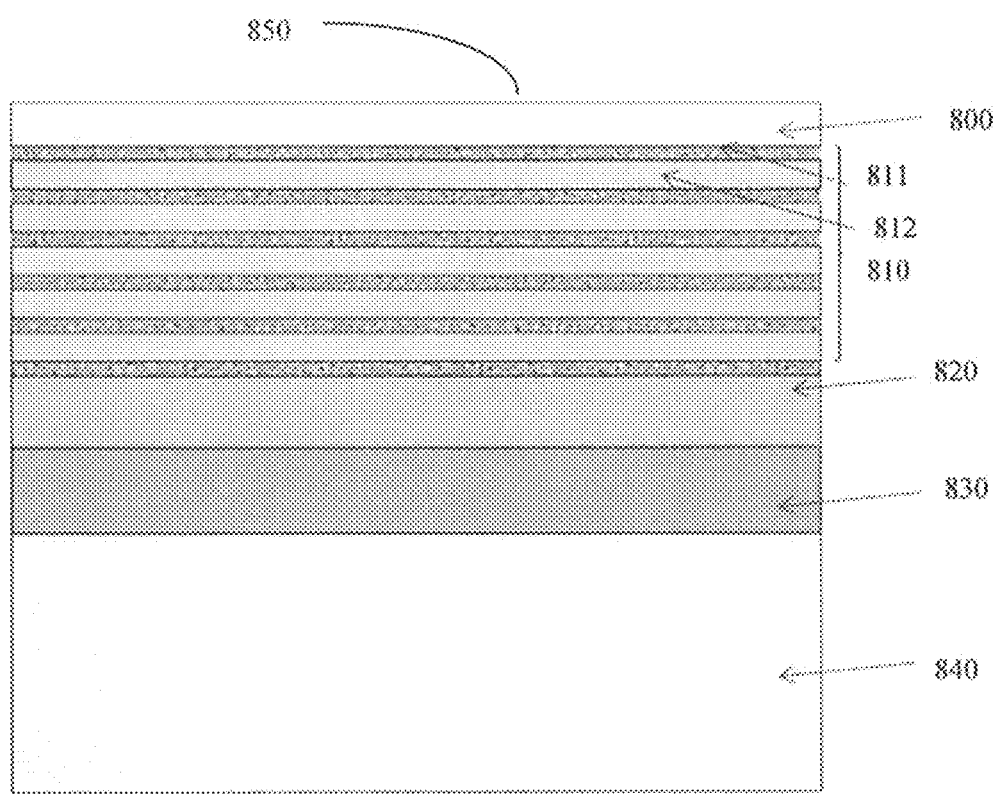
FIG. 20 is a schematic diagram showing the high temperature capability EBC interlayer.

In another aspect of the innovation, the EBC system may include an optional intermediate layer 810 between the EBC layer 1 800 and the EBC layer 2 820. The optional intermediate layer 810 may minimize the interface reactions, thus allowing for better temperature capability and coating compatibility. In one embodiment, the optional intermediate layer 810 may be an Alternating-Composition-Layered-Ceramic (ACLC) coating with the t' $HfO_2$ layer 811 and (rare earth monosilicate $RE_2SiO_5$ and/or low expansion and low $SiO_2$ activity $Hf_{1-x}Si_xO_2$ or $Hf_{2-2x}Si_{2x}O_4$ with x less than 0.5) 812, as shown in FIG. 20. EBC layer 1 800 is closest to a surface 850, while the EBC bond coat system 830 is closest to the substrate 840 (e.g., SiC/Sic or C/SIC CMC).

Figure 21A:
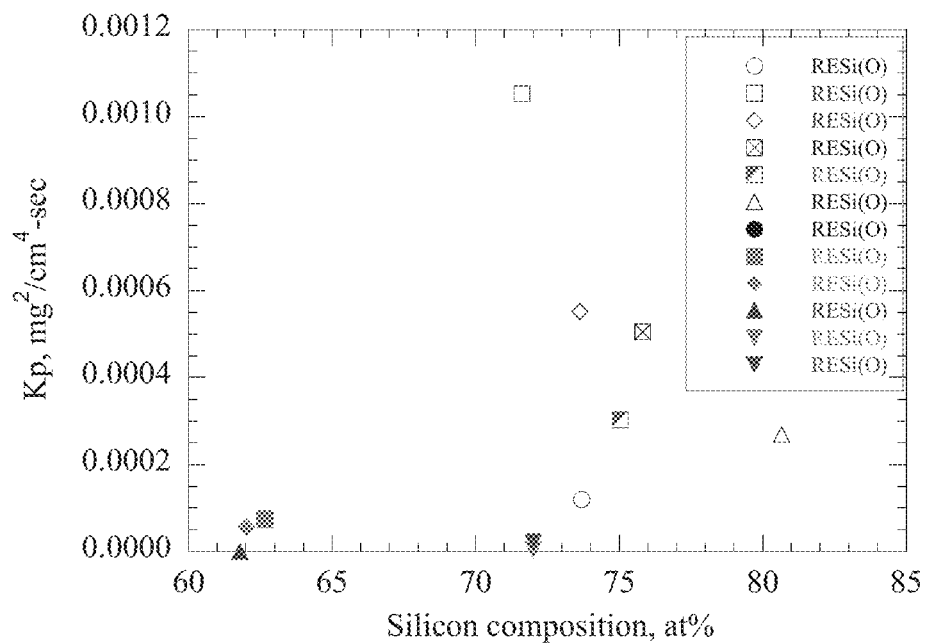
FIGS. 21A and 21B depict the parabolic rate constant as a function of Si content of rare earth silicon (O) based EBC bond coats. (a) Kp vs Si concentration. (b) ln(Kp) vs Si concentration.
Figure 21B:
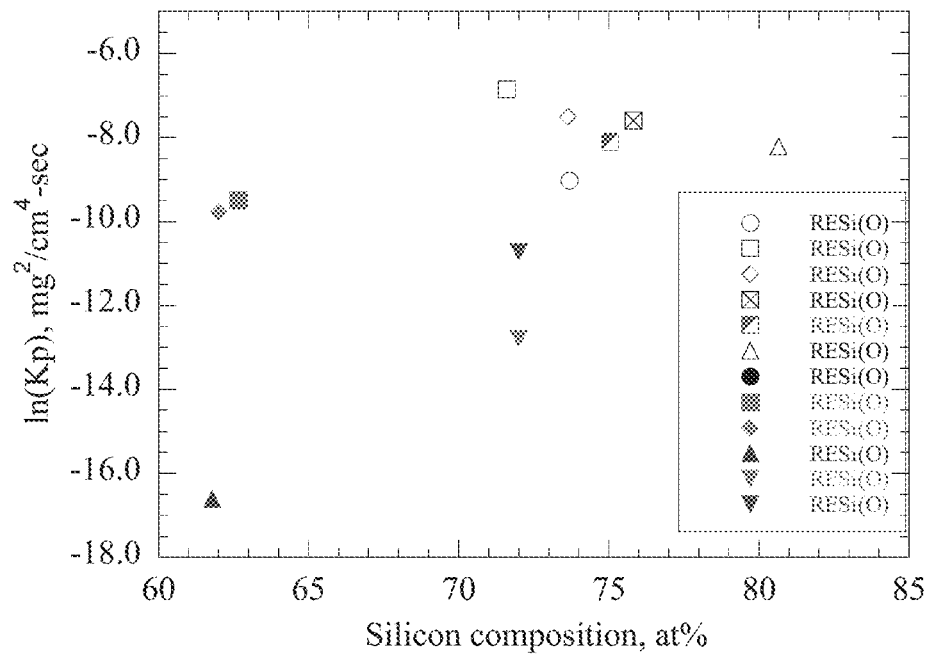
Figure 22A:
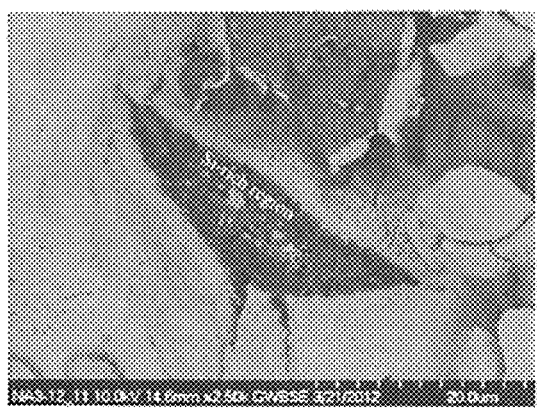
FIGS. 22A and 22B depict SEM images of advanced $HfO_2$-doped YbSi bond coat and shows the improvements stabilizing $SiO_2$ phase and $SiO_2$ phase separations. (a) depicts an SEM image of a YbSi, (no dopant) exposed to 1100° C. for 20 hours and shows separation of Si-rich/silica rich phase. (b) depicts an SEM image of $YbSi_x$+Hf exposed to 1100° C. for 20 hours and shows Si-rich/silica rich phases converted to more stable $HfO_2$ rich phases.
Figure 22B:
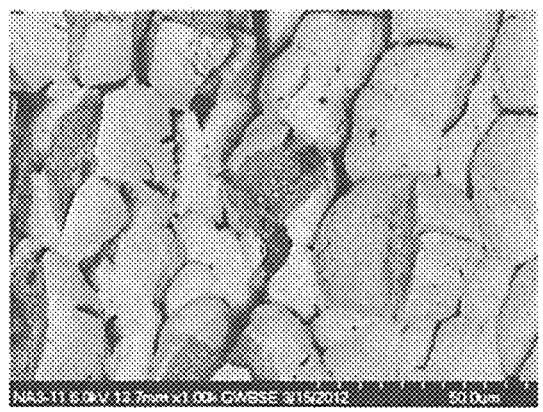
Figure 23A:
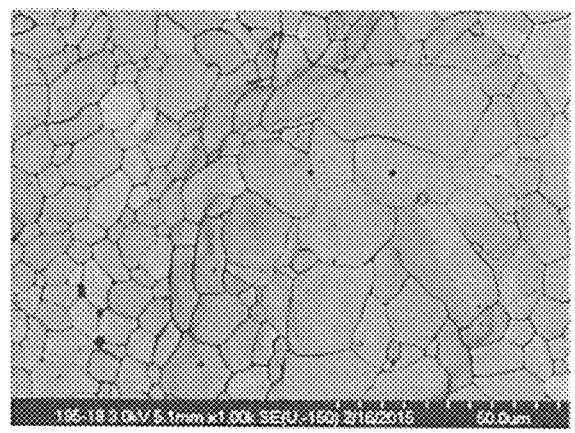
FIGS. 23A and 23B depict SEM images of advanced $HfO_2$-doped YbSi(O) EBC bond coat compositions showing improved high temperature stability, environmental resistance, and reduce grain growth. (a) depicts an SEM image of a YbSi—YbSi(O) EBC bond coat tested at 1500° C. (b) depicts an SEM image of a YbSi—YbSi(O)+Hf EBC bond coat tested at 1500° C.
Figure 23B:
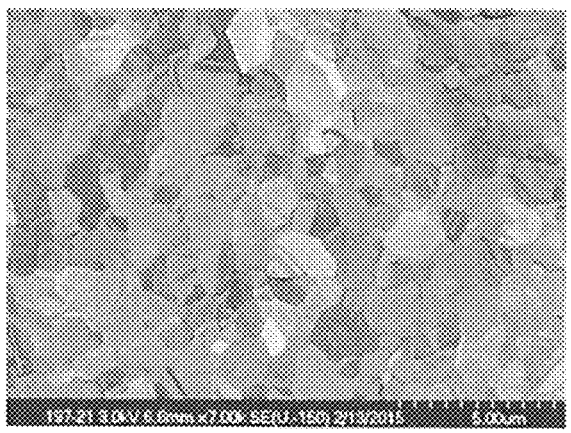

In order to improve environmental barrier coating adhesion and bonding strength, thus providing ultimate environmental protection for prime-reliant EBC systems, advanced bond coat layer may be designed with a dynamic slow growth protective scale formation for oxidation resistance and seal healing, with the oxidation growth parabolic rate constant lower than $5 \times 10^{-8}$ $mg^2/cm^4$-s. The environmental bond coat system may have a coating thickness that is ranging from 20 to 200 micrometers. An example of the parabolic oxidation rate constant is shown in FIGS. 21A and 21B which show the parabolic oxidation rate constants of some YbGdYSi(O) bond coats as a function of the silicon content, showing the low oxidation rate in the rare earth disilicide concentration region. It is observed experimentally that the EBC bond coats with rare earth disilicide and monoscilicide concentration Si content regions, when with proper dopant additions, had the highest furnace cyclic life and lowest oxidation rates due to their high temperature capability and superior oxidation resistance.

In one aspect of the innovation, the bond coat comprises two major composition categories, described here as Group A and Group B. Group A is an advanced silicon based alloy system, in particular the rare earth (RE) based or doped silicon alloys and compounds. Suitable rare earth metals include, but are not limited to, ytterbium, gadolinium, neodymium, samarium, lutetium, erbium, europium, terbium, dysprosium, holmium, lanthanum, cerium, praseodymium, promethium, thulium (so called lanthanides) and plus yttrium and scandium, or doped carbide-nitrides, oxygen doped carbide-nitrides, or two or more thereof. Group B is a highly stable oxide and silicate based material system.

The novel bond coat system of the innovation comprises advanced multi-component compositions in an arrangement to form thermodynamically stable, multi-scale composites that have superior performance as compared to the current state of the art silicon bond coat. According to an embodiment of the innovation, the bond coat system has a thermal expansion co-efficient in a range of about 4 to about $6 \times 10^{-6}$ m/m-K. This is comparable to Si-based ceramics and the current Silicon bond coat system. The coating of the innovation may be processed consistent with all the current state-of-the-art coating processing methods.

The first constituent Group A of the bond coat system, is selected from rare earth doped or alloyed silicon; and rare earth (RE) silicides (various stoichiometry compounds including $RE_5Si_3$, $RE_5Si_4$, RESi, $RE_3Si_5$, $RESi_2$), which include ytterbium silicides, yttrium silicides, gadolinium silicides, erbium silicides); rare earth (RE) silicides doped with zirconium, hafnium, aluminum and a combination of thereof; rare earth (RE) doped refractory transition metal silicides, which include rare earth (RE) doped or alloyed zirconium silicides, hafnium silicides, tantalum silicides, titanium silicides, chromium silicides, iron silicides, molybdenum silicides, niobium silicides and aluminum silicides; rare earth (RE) and aluminum doped palladium, irridium and platinum silicides; rare earth (RE) doped or non-doped tatalum-, titanium-, chromium-, molybdenum-, niobium-, aluminum-silicon carbon, boron, nitride and compounds and with Silicon, such as $Ti_x(AlCrTa)_ySi$—CN, $Ti_x(AlCrTa)_ySi$—BN, $Ti_2CrTa(Si)$—N, ZrTaSi—N, HfTaSiCN, and $Ta_2AlSi$—CN; and a combination of thereof, and co-doped with oxygen, nitrogen and boron. The oxygen, nitrogen and boron dopants can be incorporated during the coating processing, or by incorporating oxide-silicate dopants.

The second constituent Group B may be selected from rare earth (RE) oxides ($RE_2O_3$), which include ytterbium oxide, yttrium oxide, gadolinium oxide, europium oxide; rare earth mono-silicate ($RE_2SiO_5$) and di-silicates ($RE_2Si_2O_7$) that include $Yb_2SiO_5$ and $Yb_2Si_2O_7$, $Y_2SiO_5$ and $Gd_2Si_2O_7$, $Gd_2SiO_5$ and $Gd_2Si_2O_7$; other oxides that include barium oxide (BaO) and strontium oxide (SrO); titanium and tantalum-doped and undoped rare earth zirconium and hafnium pyrochlore oxides such as $RE_2Zr_2O$, and $RE_2Hf_2O_7$; rare earth aluminum garnets (REAG or $Y_3Al_5O_{12}$, such as YAG, YbAG), rare earth aluminum monoclinics (REAM, such as YAM, YbAM) and rare earth aluminum perovskites (REAP or REAlO3, such as YAP, YbAP); zirconium oxide ($ZrO_2$) and hafnium oxide $HfO_2$; and Rare Earth (RE) Oxide Doped $ZrO_2$ and $HfO_2$, and also transition metal doped, and/or $SiO_2$ doped or alloyed $ZrO_2$ and $HfO_2$; and a combination thereof. The Group B constituents improve the temperature capability, environmental stability and strength capability of the bond coating system.

In one embodiment, in low oxygen partial pressure and oxygen depleted cases as when the EBC coating is near the CMC-EBC bond coat interface, the EBC bond coat constituent of Group B may be selected from hafnium metals with soluble and doped oxygen Hf(O), $HfO_{2-y}$; zirconium metals with soluble and doped oxygen Zr(O); $ZrO_{2-y}$; rare earth metals RE(O), and $RE_2O_{3-y}$.

As mentioned above, Group A and Group B, each with the compositions within its own Group and combination thereof, can be used for environmental barrier coating bond coats, as shown in FIG. 12A.

As described herein, the bond coating system may comprise two components, herein referred to as the Group A and Group B compositions. In one embodiment, the Group B composition includes a reinforcement embedded in the Group A composition or vice versa. In the rare earth silicides, the dopants such as aluminum and oxygen will ensure the superior cyclic and oxidation resistance under lower temperature conditions preventing "pesting" from occurring, in particular by modifying the bond coat interface and grain boundary phases.

In one embodiment, the Group A and Group B combined composition may include an oxide (including oxygen depleted oxides) – silicate + silicon alloy composite system. This design ensures the optimum integrity and performance of the coatings. A thin layered low diffusional coating with the thickness ranging from about 0.5 micrometers to about 50 micrometers near the bond coat/CMC interface, and near the environmental barrier coating top coats/bond coat interface can be incorporated, utilizing a higher silicon content, high temperature capable amorphous or crystalline phased $Ta_xSiCN$, $HfTaSiCN$, $Ti_x(AlCrTa)_ySiCN$ or other compositions selected from Groups A and B. The bond coat system can be also arranged in the layered composite configurations, as disclosed in U.S. patent application Ser. No. 13/923,450.

In another embodiment of the innovation, the Group A composition may have higher silicon content designs to ensure the best oxidation resistance. Where the Group A composition is a doped silicon alloy or a silicide the bond coating composition will preferably have a silicon molar concentration from 50 to 99.5 molar %. Where the Group A composition is a rare earth silicide or other doped silicide, silicon-rich silicides (e.g., $RE_3Si_5$ and $RESi_2$) may be used. In one embodiment, the Group A composition is a rare earth silicide or other doped silicide and the Group B composition is a mixture phased region of RESi, $RE_3Si_5$ and $RESi_2$ with the silicon concentration between 50 and 67 molar %. In this embodiment, the bond coating will preferably have a silicon molar concentration from 62 to 70%. The silicon-rich bonded silicides composites will give the optimum coating temperature capability and durability.

In another aspect of the innovation, the bond coating system comprises a $Ti_x(AlCrTa)_ySi$, $Ti_x(AlCrTa)_ySi$—(C)N, and/or HfTaSiAl—(C)N type coating systems having a silicon concentration of up to about 50 to about 60 molar % also helps the extremely high temperature capable (1600-1700° C.) with exceptional mechanical properties, and low diffusivity amorphous coating formation, wherein x:y can be 1:1 or 2:1. In one embodiment, the silicon concentration may be in the range of about 10 to about 70 molar %, about 20 to about 60 molar %, or about 30 to about 60 molar %.

In one embodiment the Group A composition may include a rare earth silicide, e.g., RESi, $RE_3Si_5$, $RESi_2$, or a combination thereof. The Group A composition may be co-doped and co-alloyed with the Hf(O), $HfO_{2-y}$, and $HfO_2$; Zr(O), $ZrO_{2-y}$, and $ZrO_2$, for improved thermal stability and oxidation resistance. $HfO_2$ dopants have been found to improve the resistance to pesting by significantly stabilizing $SiO_2$ phase and reduce $SiO_2$ separation and by reducing the rare earth-silicide based bond coat grain growth at high temperatures.

Figure 24:
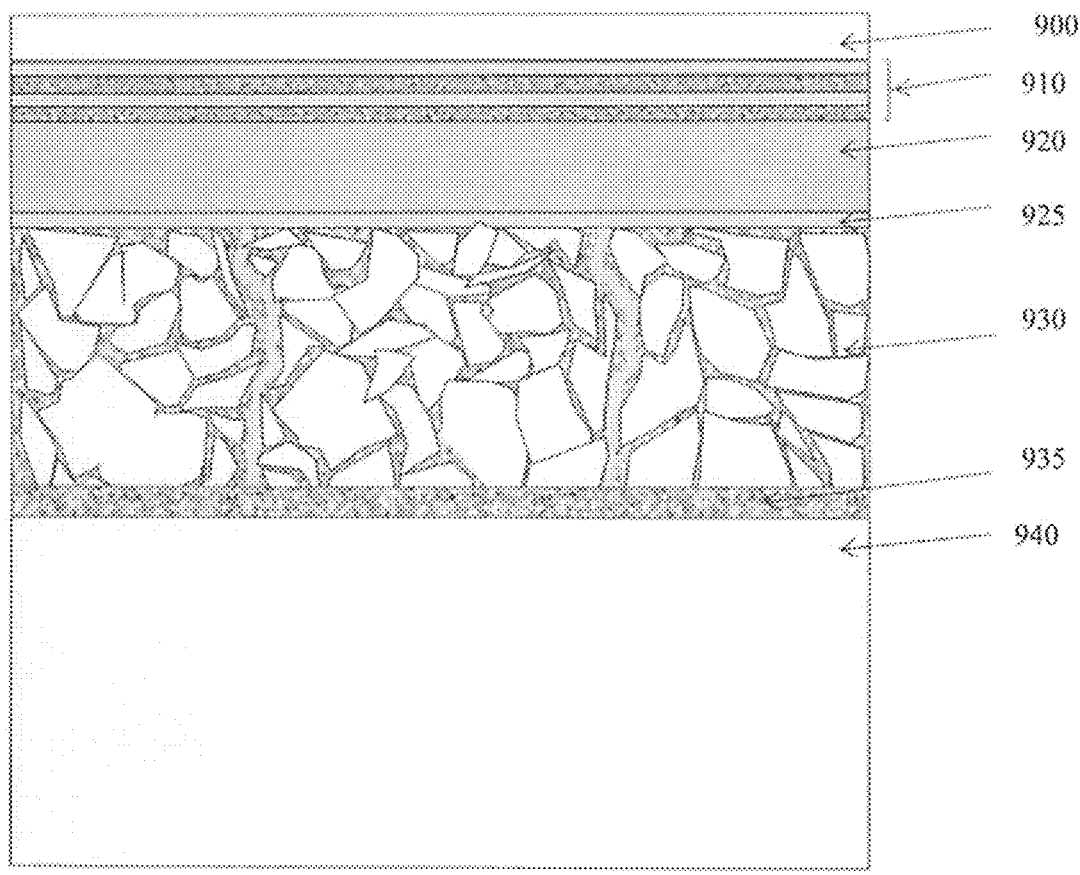
FIG. 24 is a schematic of an EBC bond coat system according to the innovation showing a composite microstructure with $HfO_2$ or $ZrO_2$ doped rare earth silicon RESi (O) bond coat system having modified grain boundary phases and bond coat/CMC interfaces.
Figure 25A:
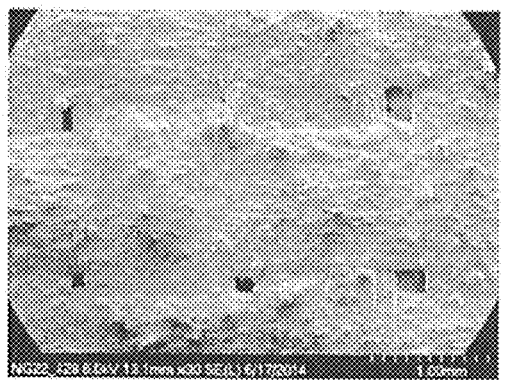
Figure 25E:
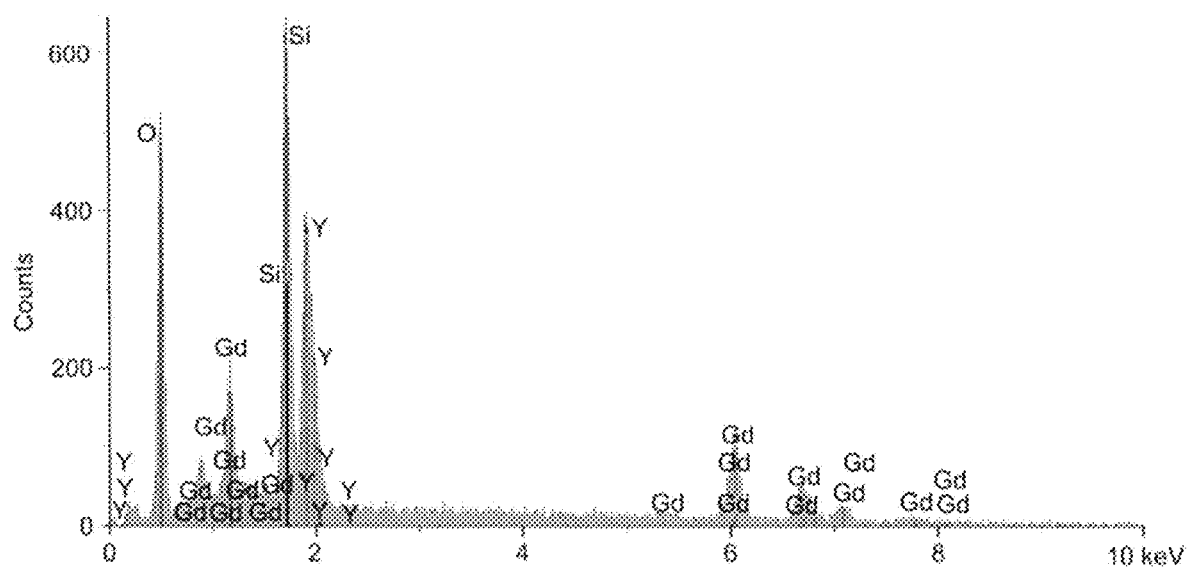
Figure 36A:
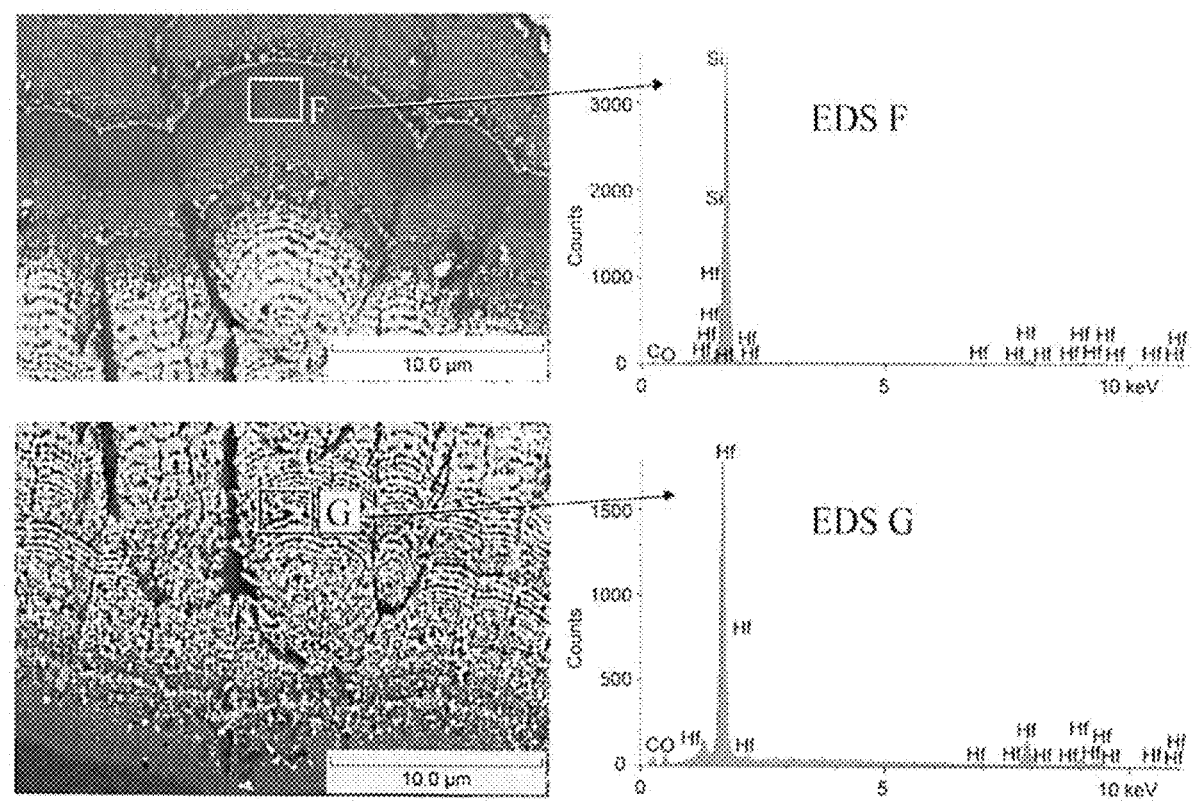

In another embodiment, the EBC bond coat system consists of Group A+ Group B+ dopant toughed bond coats, with the thin grain boundary phases containing Hf(O) (including $HfO_{2-y}$, and $HfO_2$) and Zr(O) (including $ZrO_{2-y}$ and $ZrO_2$) doped silicon rich RESi, $RE_3Si_5$ and $RESi_2$ or a combination thereof; Hf(O) (including $HfO_{2-y}$, and $HfO_2$) and Zr(O) (including $ZrO_{2-y}$, and $ZrO_2$) $SiO_2$ along a thin bond coat interface layer for high strength, toughness and oxidation resistance. A schematic of the composite bond coat assembly is shown in FIG. 24. In this embodiment, self-grown EBCs 925 may be located between the EBC bond coat system 930 and the EBC layer 2 920. The EBC bond coat compositions can also be designed to self-forming protective environmental barrier coatings, an example of which is shown in FIG. 25A.

The EBC bond coats designed compositions suppress the oxidation of the SiC/SiC or C/SiC CMCs. A low partial pressure near the bond coat/CMC interfaces, depending on the temperatures, the partial pressure of oxygen ($pO_2$) can approximately be as low as $10^{-30}$ torr. With increasing the partial pressure of oxygen ($pO_2$) towards the surface, one can expect to have the increased oxygen contents with the corresponding phase equilibria:

For an HfO—Si bond coat system:

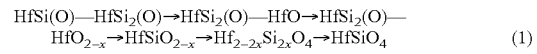  (1)

For a rare earth silicide systems

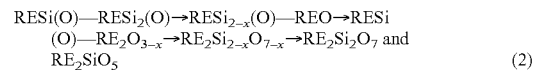  (2)

The bond coat oxidation and protective silicate scale formation help to protect the CMC from degradation in harsh high temperature oxidizing and moisture operating environments. Examples of SEM cross-section microstructures of a $HfO_{2-x}$—Si bond coat and the EDS composition analyses are shown in FIG. 26. The EBC bond coat systems also have demonstrated CMAS and fatigue environment durability in laboratory tests. Specifically, laboratory tests demonstrated CMA resistance and fatigue loading of the RESi based EBC system at 1500° C. for up to 1000 hr; silica-rich phase precipitation in CMAS; and rare earth leaching into melts (low concentration 9 mol. %).

The Group A+ Group B coating composition of the innovation further enhances the coating system capabilities. The refractory metal and rare earth oxides-silicates can further protect the silicide from oxidation, improve the coating strength and toughness, and prevent the coating from "pesting" in certain low temperature conditions. The advanced RE and RE doped silicon-silicide and oxide-silicate compositions also enhance the bond coat self heating if there is cracking developed and also provide excellent oxidation and combustion environment protection under extreme environments.

Figure 27:
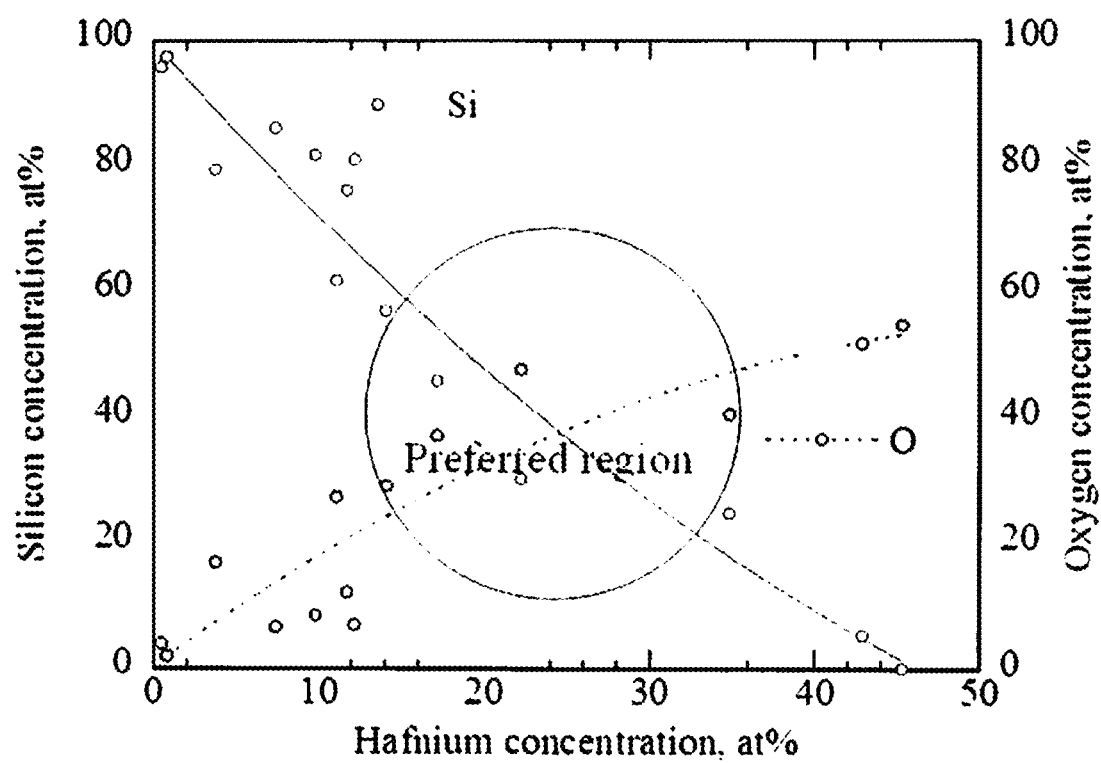
FIG. 27 is a graph depicting the interrelationship between Hf, Si, and O concentrations. It can be seen that the coating architecture and $HfO_2$ contents can be effectively controlled and optimized. The bond coat interface regions retained low oxygen contents, particularly near tower hafnium content region.

FIG. 27 provides quantitative composition range information and shows that with increasing Hf content, and, thus, decreasing Si content, the oxygen content increases. In one embodiment, the concentrations for Hf, Si, and O may be selected from the "preferred region" identified in FIG. 27. It will be understood that concentrations outside of this region may also be utilized.

What has been described above includes examples of the innovation. It is, of course, not possible to describe every conceivable combination of components or methodologies for purposes of describing the subject innovation, but one of ordinary skill in the art may recognize that many further combinations and permutations of the innovation are pos-

What is claimed is:

1. An environmental barrier coating system comprising:
 a bond coat layer, that upon placement of the system is configured to be adjacent to a ceramic substrate, the bond coat layer comprising:
  a multi-component dopant comprising a first constituent group and a second constituent group; and
  a thin grain boundary phase comprising at least one of hafnium oxide or zirconium oxide and a rare earth silicide;
 a first barrier layer comprising at least one rare earth silicate; and
 a second barrier layer comprising a rare earth oxide and an $SiO_2$ dopant.

2. The environmental barrier coating system of claim 1, wherein the rare earth silicate of the first barrier layer is selected from t' $HfO_2$, t' $ZrO_2$, or t' $HfO_2$—$ZrO_2$.

3. The environmental barrier coating system of claim 1, wherein the first constituent group is at least one of:
 selected from the group consisting of: a rare earth doped or alloyed silicon, a rare earth (RE) silicides; rare earth silicides doped with zirconium, hafnium, aluminum, and combinations thereof; and
 rare earth doped refractory transition metal silicides, rare earth and aluminum doped palladium, iridium, and platinum silicides; rare earth doped or non-doped tantalum-, titanium-, chromium-, molybdenum-, niobium-, aluminum-.

4. The environmental barrier coating system of claim 3, wherein the rare earth silicide is selected from the group consisting of $RE_5Si_3$, $RE_5Si_4$, $RESi$, $RE_3Si_5$, $RESi_2$, and a combinations thereof.

5. The environmental barrier coating system of claim 4, wherein the rare earth silicide is selected from the group consisting of ytterbium silicides, yttrium silicides, gadolinium silicides, erbium silicides, and combinations thereof.

6. The environmental barrier coating system of claim 3, wherein the rare earth doped refractory transition metal silicide is selected from the group consisting of which rare earth doped or alloyed zirconium silicides, hafnium silicides, tantalum silicides, titanium silicides, chromium silicides, iron silicides, molybdenum silicides, niobium silicides, aluminum silicides, and combinations thereof.

7. The environmental barrier coating system of claim 3, wherein the first constituent group is selected from the group consisting of $Ti_x(AlCrTa)_ySi$—CN, $Ti_x(AlCrTa)_ySi$—BN, $Ti_2CrTa(Si)$—N, ZrTaSi—N, HfTaSiCN and $Ta_2AlSi$—CN; and combinations thereof.

8. The environmental barrier coating system of claim 1 wherein the multi-component dopant is co-doped with oxygen, nitrogen, and boron.

9. The environmental barrier coating system of claim 1, wherein the second constituent group is selected from the group consisting: of rare earth oxides; rare earth mono-silicate ($RE_2SiO_5$) and di-silicates ($RE_2Si_2O_7$); barium oxide (BaO); strontium oxide (SrO); titanium and tantalum-doped and undoped rare earth zirconium or hafnium pyrochlore oxides ($RE_2Zr_2O_7$ or $RE_2Hf_2O_7$); rare earth aluminum garnets (REAG or $Y_3Al_5O_{12}$, such as YAG, YbAG), rare earth aluminum monoclinics (REAM), such as YAM, YbAM; rare earth aluminum perovskites (REAP or $REAlO_3$), such as YAP, YbAP; zirconium oxide ($ZrO_2$), hafnium oxide ($HfO_2$); rare earth oxide doped $ZrO_2$ or $HfO_2$; transition metal doped, and/or $SiO_2$ doped or alloyed $ZrO_2$ and $HfO_2$; and combinations thereof.

10. The environmental barrier coating system of claim 9, wherein the rare earth oxide is selected from the group consisting of ytterbium oxide, yttrium oxide, gadolinium oxide, europium oxide, and combinations thereof.

11. The environmental barrier coating system of claim 9, wherein the rare earth mono-silicate ($RE_2SiO_5$) and di-silicates ($RE_2Si_2O_7$) are selected from $Yb_2SiO_5$ and $Yb_2Si_2O_7$; $Y_2SiO_5$ and $Gd_2Si_2O_7$; or $Gd_2SiO_5$ and $Gd_2Si_2O_7$.

12. The environmental barrier coating system of claim 1, wherein the dopant is a rare earth oxide multi-component dopant comprising a combination of small and large rare earth components and is selected from the combination of $Yb_2O_3$ and $Gd_2O_3$; $Yb_2O_3$ and $Nd_2O$; $Lu_2O_3$ and $Gd_2O_3$; $Lu_2O_3$ and $Nd_2O_3$; $Y_2O_3$ and SiO2; and alloys thereof.

13. The environmental barrier coating system of claim 1, wherein the bond coat layer comprises a silicon molar concentration from about 50 to about 99.5 molar %.

14. The environmental barrier coating system of claim 1, wherein the bond coat layer comprises a silicon-rich silicide comprising a silicon concentration of about 50 to about 67 molar %.

15. The environmental barrier coating system of claim 1, wherein the bond coat layer comprises a rare earth silicide co-doped and co-alloyed with at least one of hafnium oxide or zirconium oxide.

16. An environmental barrier coating system comprising:
 a bond coat layer, that upon placement of the system, is configured to be adjacent to a ceramic substrate, the bond coat layer comprising a multi-component dopant having a first constituent group and a second constituent group;
 a first barrier layer comprising at least one rare earth silicate;
 a second barrier layer comprising a rare earth oxide and an SiO2 dopant; and
 an interface layer between the first barrier layer and the second barrier layer wherein the interface layer is an alternating-composition-layered-ceramic coating comprising:
 a t' HfO2 layer; and
 a layer comprising at least one of a rare earth monosilicate RE2SiO5, a low expansion and low SiO2 activity Hf1−xSixO2, a Hf2−2xSi2xO4 with x less than 0.5, or a combination of two or more thereof.

17. The environmental barrier coating system of claim 16, wherein the rare earth silicate of the first barrier layer is selected from t'HfO2, t'ZrO2, or t' HfO2–ZrO2.

18. The environmental barrier coating system of claim 16, wherein the first constituent group is at least one of:
 selected from the group consisting of: a rare earth doped or alloyed silicon, a rare earth (RE) silicides; rare earth silicides doped with zirconium, hafnium, aluminum, and combinations thereof; and
 rare earth doped refractory transition metal silicides, rare earth and aluminum doped palladium, iridium, and platinum silicides; rare earth doped or non-doped tantalum-, titanium-, chromium-, molybdenum-, niobium-, aluminum-.

19. The environmental barrier coating system of claim 18 wherein the rare earth silicide is selected from the group consisting of: RE5Si3, RE5Si4, RESi, RE3Si5, RESi2, and combinations thereof.

20. The environmental barrier coating system of claim 19, wherein the rare earth silicide is selected from the group consisting of ytterbium silicides, yttrium silicides, gadolinium silicides, erbium silicides, or and a combinations of two or more thereof.

* * * * *